US012674705B2

(12) United States Patent
Saari et al.

(10) Patent No.: US 12,674,705 B2
(45) Date of Patent: Jul. 7, 2026

(54) METHOD AND APPARATUS FOR PRODUCING CALIBRATED SPECTRAL IMAGING DEVICES

(71) Applicant: Teknologian tutkimuskeskus VTT Oy, Espoo (FI)

(72) Inventors: Heikki Saari, Espoo (FI); Harri Ojanen, Espoo (FI); Antti Näsilä, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 109 days.

(21) Appl. No.: 18/858,559

(22) PCT Filed: Apr. 14, 2023

(86) PCT No.: PCT/FI2023/050210
§ 371 (c)(1),
(2) Date: Oct. 21, 2024

(87) PCT Pub. No.: WO2023/203280
PCT Pub. Date: Oct. 26, 2023

(65) Prior Publication Data
US 2025/0271301 A1 Aug. 28, 2025

(30) Foreign Application Priority Data
Apr. 22, 2022 (FI) ..................................... 20225335

(51) Int. Cl.
*G01J 3/26* (2006.01)
*G01J 3/10* (2006.01)
(Continued)

(52) U.S. Cl.
CPC . *G01J 3/26* (2013.01); *G01J 3/10* (2013.01); *G01J 3/2803* (2013.01);
(Continued)

(58) Field of Classification Search
CPC .... G01J 3/26; G01J 3/10; G01J 3/2803; G01J 3/2823; G01J 2003/1247;
(Continued)

(56) References Cited

U.S. PATENT DOCUMENTS

2010/0245832 A1 9/2010 Saari
2014/0176729 A1* 6/2014 Saari ..................... G01J 3/0208
348/182
(Continued)

OTHER PUBLICATIONS

European Patent Office, International Search Report, Application No. PCT/FI2023/050210, Mailed Aug. 7, 2023, 5 pages.
(Continued)

*Primary Examiner* — Jamil Ahmed
(74) *Attorney, Agent, or Firm* — ZIEGLER IP LAW GROUP, LLC.

(57) ABSTRACT

Calibrating a spectral imaging device includes
providing first calibration light, with first calibration spectrum ($I_{MPBF}$),
coupling the first calibration light to the device,
obtaining a first measured profile of the first calibration light by recording first detector pixel signals during scanning a control parameter of a Fabry-Perot interferometer of the device,
obtaining a second measured profile of the first calibration light by recording second detector pixel signals during scanning,
determining a first simulated profile from the first calibration spectrum using previously measured spectral quantum efficiency of first detector pixels, previously measured spectral transmittance function, and first calibration data,
determining a second simulated profile from the first calibration spectrum using previously measured spectral quantum efficiency of second detector pixels, pre-
(Continued)

viously measured spectral transmittance function, and the first calibration data, and modifying first calibration data until simulated profiles match with corresponding measured profiles.

11 Claims, 18 Drawing Sheets

(51) Int. Cl.
   *G01J 3/12*      (2006.01)
   *G01J 3/28*      (2006.01)
   *G01N 21/27*     (2006.01)

(52) U.S. Cl.
   CPC .......... *G01J 3/2823* (2013.01); *G01N 21/274* (2013.01); *G01J 2003/1247* (2013.01); *G01J 2003/2826* (2013.01); *G01J 2003/2859* (2013.01); *G01J 2003/2879* (2013.01)

(58) Field of Classification Search
   CPC ....... G01J 2003/2826; G01J 2003/2859; G01J 2003/2879; G01N 21/274
   See application file for complete search history.

(56) References Cited

U.S. PATENT DOCUMENTS

2014/0368825 A1   12/2014  Rissanen et al.
2018/0080825 A1    3/2018  Learmonth et al.

OTHER PUBLICATIONS

European Patent Office, Written Opinion of the International Searching Authority, Application No. PCT/ FI2023/050210, Mailed Aug. 7, 2023, 6 pages.

Näsilä Antti, "Validation of Aalto-1 Spectral Imager Technology to Space Environment", XP093067352, Jan. 1, 2013, Retrieved from the Internet: URL: https://aaltodoc.aalto.fi/bitstream/handle/123456789/10451/master_Näsilä_Antti_2013.pdf?sequence=1, 90 pages.

Finnish Patent and Registration Office, Office Action, Application No. 20225335, mailed Nov. 29, 2022, 11 pages.

* cited by examiner

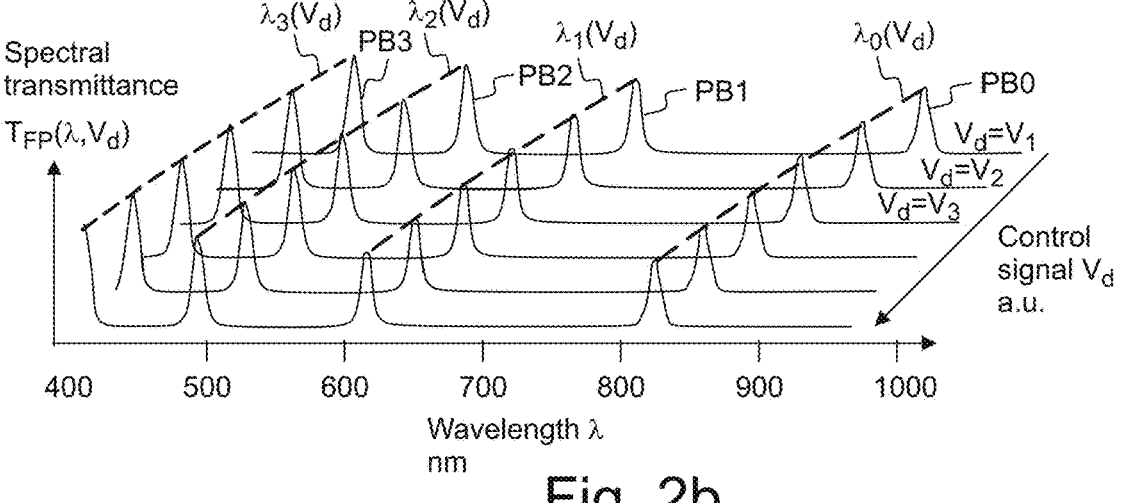

Spectral transmittance a.u.

FPEAK3

FPEAK2

PB3    PB2

FPEAK1

PB1

$T_{FP}(\lambda, V_d = V_1)$

FPEAK0

First mirror gap $d_F = d1$

PB0

0

400   500   600   700   800   900   1000

$\lambda_3(V_d = V_1)$ $\lambda_2(V_d = V_1)$ $\lambda_1(V_d = V_1)$ $\lambda_0(V_d = V_1)$ Wavelength nm Spectral transmittance a.u.

FPEAK3

FPEAK2

FPEAK1

$T_{FP}(\lambda, V_d = V_2)$

FPEAK0

Second different mirror gap $d_F = d2$

PB3    PB2

PB1

PB0

0

400   500   600   700   800   900   1000

$\lambda_3(V_d = V_2)$ $\lambda_2(V_d = V_2)$ $\lambda_1(V_d = V_2)$ $\lambda_0(V_d = V_{12})$ $\lambda_0(V_d = V_1)$ Wavelength nm

Fig. 2a

Spectral transmittance $T_{FP}(\lambda, V_d)$ $\lambda_3(V_d)$   $\lambda_2(V_d)$   $\lambda_1(V_d)$   $\lambda_0(V_d)$

PB3    PB2    PB1    PB0

$V_d = V_1$
$V_d = V_2$
$V_d = V_3$

Control signal $V_d$ a.u.

400   500   600   700   800   900   1000

Wavelength $\lambda$ nm

Fig. 2b

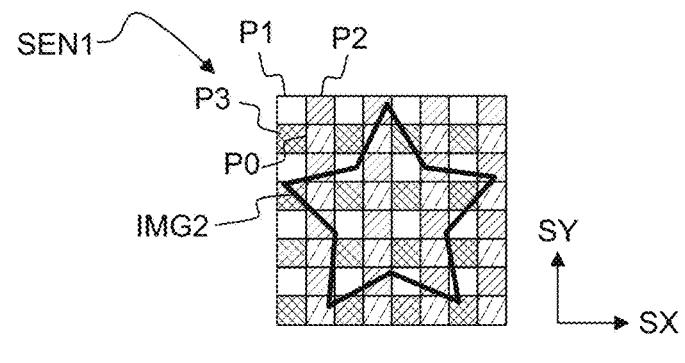

SEN1

P1　P2

P3

P0

IMG2

Spectral
quantum
efficiency
a.u.

$Q_B(\lambda)$

0

400　500　600　700　800　900　1000

$\lambda$ nm

Detector pixels
for blue light

Spectral
quantum
efficiency
a.u.

$Q_G(\lambda)$

0

400　500　600　700　800　900　1000

$\lambda$ nm

Detector pixels
for green light

Spectral
quantum
efficiency
a.u.

$Q_R(\lambda)$

0

400　500　600　700　800　900　1000

$\lambda$ nm

Detector pixels
for red light

Spectral
quantum
efficiency
a.u.

$Q_{IR}(\lambda)$

0

400　500　600　700　800　900　1000

$\lambda$ nm

Detector pixels
for infrared light

Fig. 3b

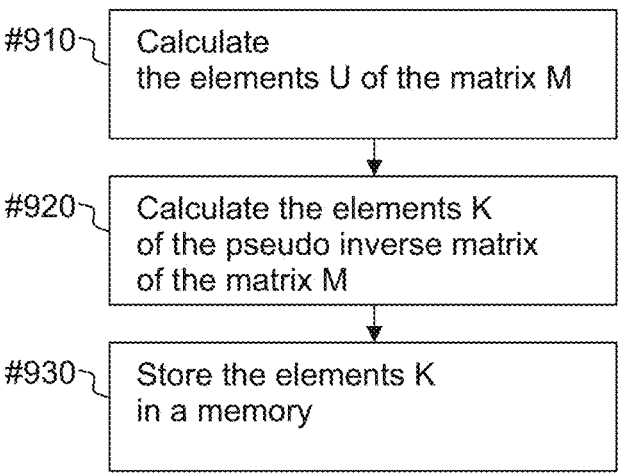

910 — Calculate
the elements U of the matrix M

920 — Calculate the elements K
of the pseudo inverse matrix
of the matrix M

930 — Store the elements K
in a memory

Fig. 8b

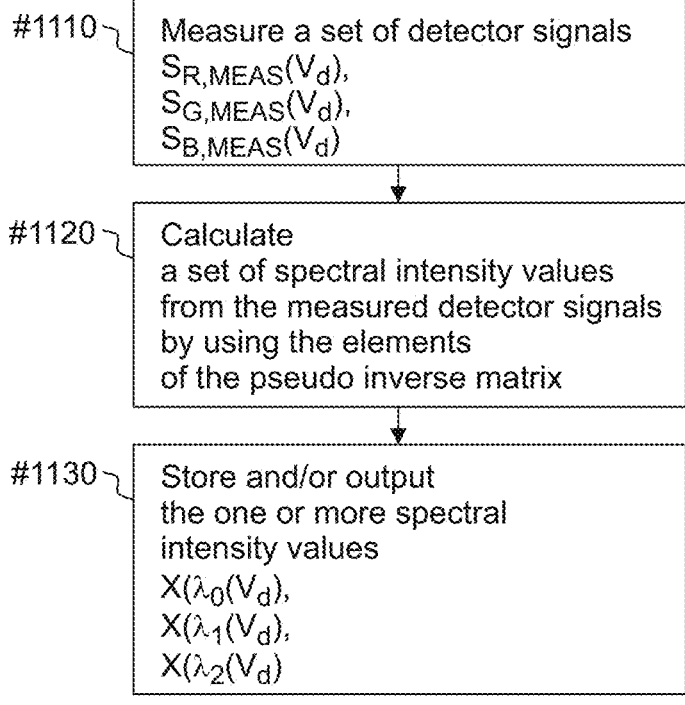

1110 — Measure a set of detector signals
$S_{R,MEAS}(V_d)$,
$S_{G,MEAS}(V_d)$,
$S_{B,MEAS}(V_d)$

1120 — Calculate
a set of spectral intensity values
from the measured detector signals
by using the elements
of the pseudo inverse matrix

1130 — Store and/or output
the one or more spectral
intensity values
$X(\lambda_0(V_d))$,
$X(\lambda_1(V_d))$,
$X(\lambda_2(V_d))$

Fig. 8c

METHOD AND APPARATUS FOR PRODUCING CALIBRATED SPECTRAL IMAGING DEVICES

FIELD

Some embodiments relate to a method for calibrating a spectral imaging device.

BACKGROUND

It is known to use a monochromator to provide narrow-band light for calibrating a spectral imaging device, which comprises a Fabry-Perot interferometer. The wavelength of the calibration light may be varied by scanning the mono-chromator. A known calibration method comprises varying the wavelength of the narrowband calibration light, and recording detector signals at several different mirror gap values of a Fabry-Perot interferometer of the spectral imaging device. Vdrying the wavelength of the narrowband light by scanning the monochromator may be time-consuming.

SUMMARY

An object is to provide a method for calibrating a spectral imaging device. An object is to provide a method for producing a calibrated spectral imaging device. An object is to provide an apparatus for calibrating a spectral imaging device.

According to an aspect, there is provided a method for calibrating a spectral imaging device, the method comprising:

obtaining first spectral data, which specifies spectral quantum efficiency of detector pixels for an image sensor, obtaining second spectral data, which specifies a spectral transmittance function for a Fabry-Perot interferometer, providing the spectral imaging device, which comprises the Fabry-Perot interferometer and the image sensor, the image sensor comprising first detector pixels and second detector pixels, a spectral quantum efficiency of the first detector pixels being different from a spectral quantum efficiency of the second detector pixels, providing first calibration light, wherein the first calibration light has a first calibration spectrum which comprises a plurality of spectral peaks, coupling the first calibration light to the spectral imaging device, obtaining a first measured profile of the first calibration light by recording first detector pixel signals during scanning a control parameter of the Fabry-Perot interferometer, obtaining a second measured profile of the first calibration light by recording second detector pixel signals during scanning the control parameter, determining a first simulated profile from the first calibration spectrum by using the spectral quantum efficiency of the first detector pixels, by using the spectral transmittance function, and by using first calibration data, determining a second simulated profile from the first calibration spectrum by using the spectral quantum efficiency of the second detector pixels, by using the spectral transmittance function, and by using the first calibration data, modifying the first calibration data until the simulated profiles match with the corresponding measured profiles, according to one or more matching criteria, and storing the modified first calibration data in a memory.

According to an aspect, there is provided an apparatus for calibrating a spectral imaging device, which comprises a combination of a Fabry-Perot interferometer and an image sensor, the image sensor comprising first detector pixels and second detector pixels, a spectral quantum efficiency of the first detector pixels being different from a spectral quantum efficiency of the second detector pixels, the apparatus comprising:

a communication unit for obtaining first spectral data, which specifies spectral quantum efficiency of detector pixels for an image sensor, a communication unit for obtaining second spectral data, which specifies a spectral transmittance function for a Fabry-Perot interferometer, a first calibration light source to form first calibration light, which has a first calibration spectrum which comprises a plurality of spectral peaks, wherein the apparatus is arranged to:

obtain a first measured profile of the first calibration light by recording first detector pixel signals during scanning a control parameter of the Fabry-Perot interferometer, obtain a second measured profile of the first calibration light by recording second detector pixel signals during scanning the control parameter, determine a first simulated profile from the first calibration spectrum by using the spectral quantum efficiency of the first detector pixels, by using the spectral transmittance function, and by using first calibration data, determine a second simulated profile from the first calibration spectrum by using the spectral quantum efficiency of the second detector pixels, by using the spectral transmittance function, and by using the first calibration data, modify the first calibration data until the simulated profiles match with the corresponding measured profiles according to one or more matching criteria, and store the modified first calibration data in a memory.

The scope of protection sought for various embodiments of the invention is set out by the independent claims. The embodiments, if any, described in this specification that do not fall under the scope of the independent claims are to be interpreted as examples useful for understanding various embodiments of the invention.

An assembled spectral imaging device comprises a scanning Fabry-Perot interferometer and an image sensor. For accurate measurements, the spectral imaging device may need to be calibrated. The spectral transmittance of the Fabry Perot interferometer is a function of two variables. The spectral transmittance of the Fabry Perot interferometer is the function of the wavelength ($\lambda$), and the spectral transmittance of the Fabry Perot interferometer also the function of the control parameter ($V_d$), which is indicative of the distance between the mirrors of the Fabry Perot interferometer. Measuring the complete spectral transmittance function of the Fabry Perot interferometer may be time-consuming. The calibration procedure may be significantly expedited by using previously measured information about spectral quantum efficiencies of detector pixels, and by using previously measured information about the spectral transmittance of the Fabry Perot interferometer.

The assembled spectral imaging device may be calibrated at a calibration station, e.g. at an assembly line. The calibration method may comprise:

providing first calibration light (LB1CAL1), which has first calibration spectrum ($I_{MPBF}$), which has a plurality of stable spectral peaks at known wavelengths ($\lambda_{01}$, $\lambda_{02}$, $\lambda_{03}$), coupling the first calibration light (LB1CAL1) to the spectral imaging device (500), obtaining a first measured profile (MSPEC1) of the first calibration light (LB1CAL1) by recording first detector pixel signals ($S_R$) during scanning a control parameter ($V_d$) of the Fabry-Perot interferometer (FPI1) of the spectral imaging device (500), obtaining a second measured profile of the first calibration light (LB1CAL1) by recording second detector pixel signals ($S_G$) during scanning the control parameter ($V_d$), determining a first simulated profile (SIMSPEC1) from the first calibration spectrum ($I_{MPBF}$) by using previously measured spectral quantum efficiency ($Q_R$) of first detector pixels (P0), by using previously measured spectral transmittance function ($T_{FP,PRE}$), and by using first calibration data ($f_k, g_k, h_k$), determining a second simulated profile from the first calibration spectrum ($I_{MPBF}$) by using previously measured spectral quantum efficiency (OR) of second detector pixels (P1), by using the previously measured spectral transmittance function ($T_{FP,PRE}$), and by using the first calibration data ($f_k, g_k, h_k$), and modifying the first calibration data ($f_k, g_k, h_k$) until the simulated profiles (SIMSPEC1) match with the corresponding measured profiles (MSPEC1) according to one or more matching criteria.

The spectral imaging device may be assembled at an assembly line. The image sensor may be combined with the Fabry-Perot interferometer at the assembly line. The present method allows calibrating the spectral imaging device by using previously obtained data about the quantum efficiencies of the multispectral image sensor and by using previously obtained data about the spectral transmittance of the Fabry-Perot interferometer. The present method allows calibration e.g. in mass production without a need to provide monochromatic calibration light.

The method comprises obtaining a previously spectral transmittance of a Fabry-Perot interferometer. The spectral transmittance of a Fabry-Perot interferometer may be measured at a separate facility already before assembling the spectral imaging device. The measured spectral transmittance may be subsequently communicated to the calibration station of an assembly line e.g. via the internet.

The previously measured quantum efficiencies and the previously measured spectral transmittance may be forwarded e.g. to a calibration station, where the final calibration of the assembled spectral imaging device may be performed. The assembly line may comprise a calibration station for performing calibration of the spectral imaging device. The calibration station provides first calibration light, which has a plurality of stable spectral peaks for determining the spectral scale of the spectral imaging device. The first calibration light may be formed e.g. by using a multi pass band filter.

A set of measured profiles may be obtained by coupling the first calibration light to the spectral imaging device, and by recording the detector signals when scanning the Fabry-Perot interferometer.

A set of simulated profiles may be determined from the known spectrum of the first calibration light by using the previously measured quantum efficiencies, by using previously measured spectral transmittance of the Fabry- Perot interferometer, and by using calibration data. The previously measured quantum efficiencies and the spectral transmittance may be assumed to represent the assembled spectral imaging device to some degree, but not exactly. The calibration data may be iteratively modified until the simulated profiles substantially match the measured profiles. The calibration data may be iteratively modified until the simulated profiles correspond to the measured profiles to a sufficient degree. The modified calibration data may be subsequently used to provide accurate measurement results.

By using the previously measured spectral data and the stable spectral peaks of the first calibration light, it is possible to avoid using a scanning monochromator for measuring spectral response functions of the combination of the Fabry-Perot interferometer and the image sensor.

In an embodiment, the method may be performed without varying spectral positions of the spectral peaks of the generated calibration light. The method may significantly reduce the time needed for calibrating a spectral imaging device at the assembly line. Forming the simulated profiles from the previously measured spectral data may significantly reduce the time needed for calibrating a spectral imaging device at the assembly line. The method may be applicable at a production line. The method may be suitable mass production of a plurality of spectral imaging devices.

In an embodiment, additional profiles may be optionally measured by coupling second calibration light to the spectral imaging device. The second calibration light may have a broadband spectrum. The additional measured profiles may be used to further improve the calibration accuracy.

The image sensors of a manufacturing batch may have substantially similar quantum efficiencies for a given color channel. Thus, it may be sufficient to obtain the previously measured quantum efficiencies only from a small number of image sensors. It may be sufficient to measure the quantum efficiencies of e.g. less than 5% of the image sensors of a manufacturing batch. The measured quantum efficiencies may subsequently be used to represent the whole batch.

For example, spectral quantum efficiencies may be measured for a few samples from a manufacturing batch of image sensors, and the same measured spectral quantum efficiencies may be used for each image sensor of said manufacturing batch.

In an embodiment, quantum efficiencies may also be measured for each image sensor of a manufacturing batch. In an embodiment, spectral transmittances may also be measured for each interferometer of a manufacturing batch. Calibration of an assembled spectral imaging device may still be performed rapidly by using the previously measured information about the quantum efficiencies and the spectral transmittance.

Interferometers of a manufacturing batch may exhibit substantially similar spectral properties. In particular, interferometers of a manufacturing batch may exhibit substantially similar spectral properties when they are produced by microelectromechanical manufacturing methods (MEMS). Thus, it may be sufficient to obtain the previously measured spectral transmittances only from a small number of the interferometers. It may be sufficient to measure spectral transmittances of e.g. less than 5% of the interferometers of a manufacturing batch. The measured spectral transmittance may subsequently be used to represent the whole batch.

For example, spectral transmittances may be measured for a few samples from a manufacturing batch of Fabry-Perot interferometers, and the same measured spectral transmittances may be used for each interferometer of said manufacturing batch.

In an embodiment, the previously measured spectral transmittance may be the measured spectral transmittance of a second Fabry-Perot interferometer, which is different from the first Fabry-Perot interferometer, which is installed in the calibrated spectral imaging device.

In an embodiment, the previously measured spectral transmittance may be the measured spectral transmittance of the same Fabry-Perot interferometer, which is installed in the spectral imaging device. Calibration of the assembled spectral imaging device may still be performed rapidly by using the previously measured information about the quantum efficiencies and the spectral transmittance.

BRIEF DESCRIPTION OF THE DRAWINGS

In the following examples, several variations will be described in more detail with reference to the appended drawings, in which FIG. 2a shows, by way of example, changing the spectral positions of the spectral passbands of a Fabry-Perot interferometer, FIG. 2b shows, by way of example, the spectral transmittance of the Fabry Perot interferometer as the function of wavelength and as the function of control signal, FIG. 3a shows, by way of example, in an axial view, forming an optical image on the image sensor, FIG. 3b shows, by way of example, spectral sensitivities of detector pixels of an image sensor, FIG. 8b shows, by way of example, method steps for determining a calibration data matrix from the modified spectral transmittance, FIG. 8c shows, by way of example, method steps for determining calibrated spectral intensity values from measured signals by using elements of a calibration data matrix.

DETAILED DESCRIPTION

Figure 1A:
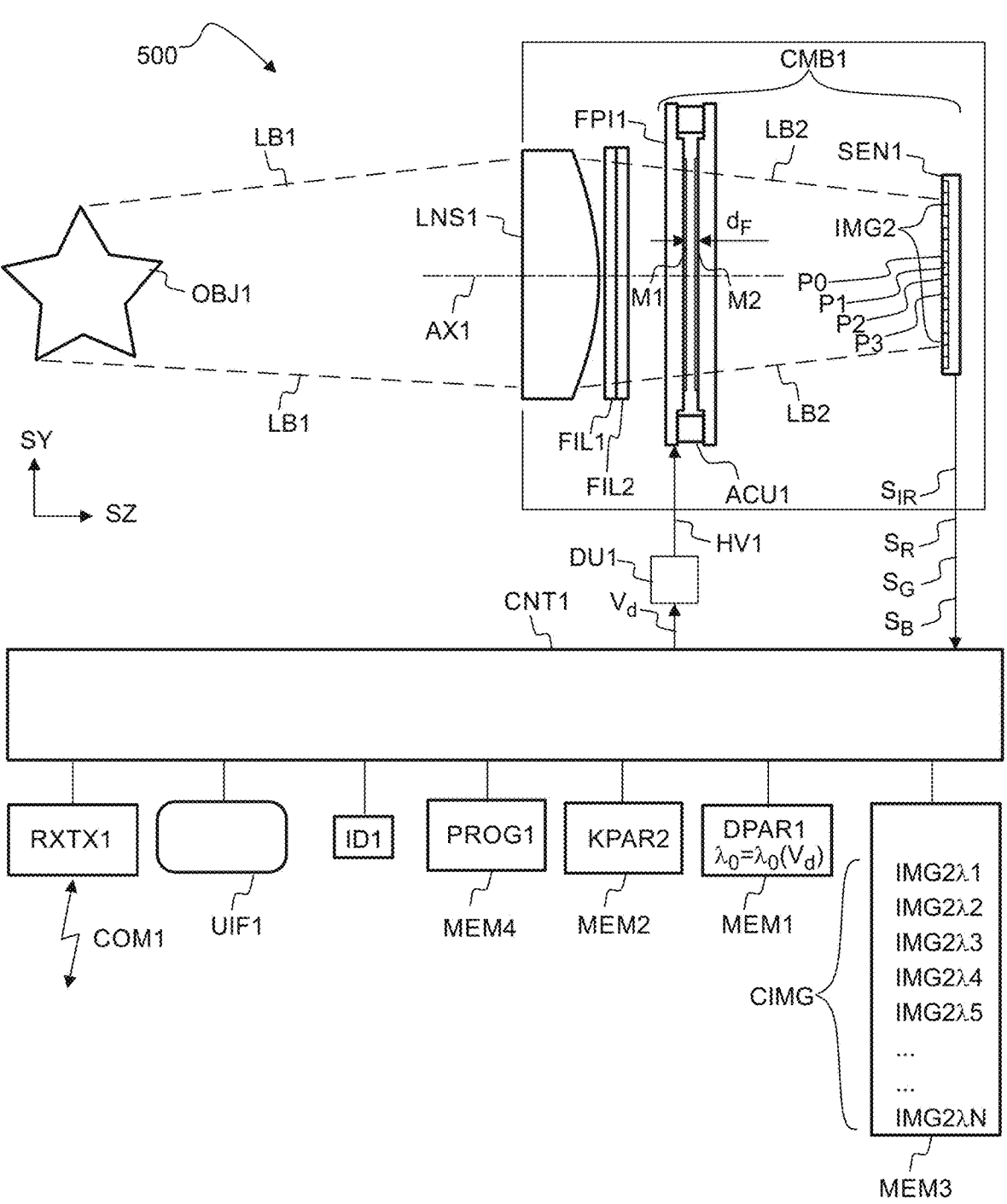
FIG. 1a shows, by way of example, a spectral imaging device.

Referring to FIG. 1a, the spectral imaging device 500 comprises an image sensor SEN1, and imaging optics LNS1 to form an optical image IMG2 of an object OBJ1 on the image sensor SEN1 by focusing light LB1 (or LB2) received from the object OBJ1. The spectral imaging device 500 comprises a tunable Fabry-Perot interferometer FPI1 to provide one or more passbands for capturing the image IMG2 in a spectrally selective manner.

The Fabry-Perot interferometer FPI1 forms transmitted light LB2 by filtering input light LB1 received from the object OBJ1. The transmitted light LB2 may contain one or more narrow discrete spectral bands of the input light LB1, as defined by the spectral transmittance peaks of the Fabry-Perot interferometer FPI1. The transmitted light LB2 may be focused to the image sensor SEN1.

The image sensor SEN1 may comprise a plurality of light detector pixels P0, P1, P2, P3 arranged in a two-dimensional array. For example, the sensor SEN1 may comprise a plurality of first detector pixels P0 to detect red light (R). The sensor SEN1 may comprise a plurality of second detector pixels P1 to 35 detect green light (G). The sensor SEN1 may comprise a plurality of third detector pixels P2 to detect blue light (B). The sensor SEN1 may comprise a plurality of fourth detector pixels P3 to detect infrared light (IR). The signals of the detector pixels P0, P1, P2, P3 may obtained from the sensor SEN1 as detector signals $S_R$, $S_G$, $S_B$, $S_{IR}$. The image sensor SEN1 may convert the optical image IMG2 into digital images, which represent the different color channels of the device 500. Each digital image may comprise an array of recorded detector signals. For example, a first digital image of a first color channel (R) may comprise the detector signals obtained from the first detector pixels P0. For example, a second digital image of a second color channel (G) may comprise the detector signals obtained from the second detector pixels P1.

The imaging optics LNS1 may comprise e.g. a camera objective to focus input light LB1 and/or transmitted light LB2, so as to form the focused optical image IMG2 of the object OBJ1 on the image sensor SEN1. The imaging optics LNS1 may also be e.g. telecentric optics or afocal optics to limit the maximum inclination of light rays passing through the Fabry-Perot interferometer FPI1.

The image sensor SEN1 may convert the optical image IMG2 into a digital image, which comprises a plurality of detector signals $S_R$, $S_G$, $S_B$ obtained from the detector pixels of the image sensor SEN1. The digital image may be a two-dimensional digital color image. The image sensor SEN1 may be arranged to capture the digital image of the object OBJ1. The spectral imaging device 500 may be arranged to form the image IMG2 of the object OBJ1 on the image sensor SEN1, and spectral intensities may be measured substantially simultaneously for two or more different parts of the object OBJ1, without a need to change the orientation of the device 500 with respect to the object OBJ1. The spectral imaging device 500 may capture a two-dimensional image IMG2 of the object OBJ1 at two or more wavelength bands (transmittance peaks) of the Fabry-Perot interferometer FPI1.

The device 500 may comprise one or more spectral cut-off filters FIL1, FIL2 for defining a minimum wavelength and a maximum wavelength of the spectral measurement range (RNG2) of the device 500.

The spectral imaging device 500 may comprise a control unit CNT1 for controlling operation of the device 500. The control unit CNT1 may be arranged to perform one or more data processing operations e.g. for calculating calibrated intensity values for the pixels of the spectral images from recorded detector signals. The control unit CNT1 may perform data processing operations by using the recorded detector signals of the captured digital images. The control unit CNT1 may also be arranged to perform one or more data processing operations e.g. for calibrating and/or verifying operation of the device 500.

The Fabry-Perot interferometer FPI1 may be tuned by changing the distance $d_F$ between semi-transparent mirrors M1, M2 of the interferometer FPI1. The interferometer FPI1 may comprise one or more actuators ACU1 for changing the distance $d_F$ between the mirrors M1, M2.

In an embodiment, the mirror M1 and/or M2 may be arranged to operate as a part of an actuator ACU1. For example, the mirror M1 and/or M2 may operate as a part of an electrostatic actuator. The spectral positions of the passbands of the interferometer FPI1 may be set according to a control signal $V_d$. For example, the interferometer FPI1 may comprise a driving unit DU1 to generate a driving voltage HV1 according to the control signal $V_d$, wherein the driving voltage HV1 may be arranged to drive the one or more actuators ACU1.

The spectral imaging device 500 may comprise a user interface UIF1 for providing information to a user and/or for receiving user input from the user. The user interface UIF1 may comprise e.g. a touch screen.

The spectral imaging device 500 may comprise a communication unit RXTX1 to receive and/or transmit data e.g. via communication COM1. The communication unit RXTX1 may communicate e.g. by wireless and/or wired communication. The spectral imaging device 500 may communicate e.g. with a database DBASE1 e.g. via the Internet. For example, measured detector signals and/or calculated spectral images may be transmitted via the communication unit RXTX1.

The spectral imaging device 500 may comprise a memory MEM4 for storing computer program code PROG1. The computer program code PROG1, when executed by one or more data processors (e.g. CNT1) of the device 500 may cause the device 500 e.g. to capture images, to calculate calibrated intensity values from measured signals, to perform a calibration operation and/or to enable a functionality.

The spectral imaging device 500 may comprise a memory MEM1 for storing spectral scale calibration data DPAR1. The spectral scale calibration data DPAR1 may specify a relation, which associates control signal values $V_d$ with actual wavelengths $\lambda$. The spectral scale calibration data DPAR1 may be expressed as a function $\lambda_0(V_d)$, which specifies a relation, which associates values of a control parameter $(V_d)$ of the Fabry-Perot interferometer (FPI1) with actual spectral positions $(\lambda_0)$ of a transmittance peak of the Fabry-Perot interferometer (FPI1).

The control parameter $V_d$ may be a control parameter of an actuator ACU1 of the Fabry-Perot interferometer FPI1. Alternatively, the control parameter $V_d$ may be indicative of a measured distance $d_F$ between the mirrors (M1, M2) of the Fabry-Perot interferometer FPI1. The Fabry-Perot interferometer FPI1 may optionally comprise e.g. a capacitive sensor for measuring the distance $d_F$ between the mirrors (M1, M2), and the sensor may provide the control parameter $V_d$ as an output indicative of the measured distance $d_F$.

The spectral transmittance $T_{FP}(\lambda, V_d)$ of the Fabry-Perot interferometer may be measured as a function of the control parameter $V_d$. The control parameter $V_d$ may be e.g. a digital signal used for setting the mirror gap of the Fabry-Perot interferometer. The control parameter $V_d$ may be e.g. indicative of a driving voltage applied to an actuator of the Fabry-Perot interferometer. Fabry-Perot interferometer may also comprise e.g. a capacitive mirror gap sensor for monitoring the mirror gap. The control parameter $(V_d)$ may be e.g. indicative of a signal of the mirror gap sensor. The control parameter $(V_d)$ may be e.g. indicative of a measured mirror gap of the Fabry-Perot interferometer. The mirror gap means the distance between the semi-transparent mirrors M1, M2 of the Fabry-Perot interferometer.

The spectral imaging device 500 may comprise a memory MEM2 for storing spectral intensity calibration data KPAR2. Signal values $S_{IR}$, $S_R$, $S_G$, $S_B$ obtained from the image sensor SEN1 may be converted into calibrated spectral intensity values by using the spectral intensity calibration data KPAR2. In particular, the data KPAR2 may comprise elements (K) of a pseudo-inverse matrix $(M^\dagger)$. The elements (K) of a pseudo-inverse matrix $(M^\dagger)$ may be determined by a calibration procedure. The spectral imaging device 500 may be arranged to determine one or more spectral intensity values $X(\lambda)$ as linear combinations of the measured detector signal values $S_{IR}$, $S_R$, $S_G$, $S_B$ by using the elements (K) as coefficients.

The spectral imaging device 500 may be arranged to obtain detector signal values $S_{IR}$, $S_R$, $S_G$, $S_B$ from the image sensor SEN1, and to determine intensity values $X_n$, $X_{n+1}$, $X_{n+2}$, $X_{n+3}$ from the detector signal values $S_{IR}$, $S_R$, $S_G$, $S_B$ by using calibration parameters KPAR2 (e.g. elements (K) of the pseudo-inverse matrix $M^\dagger$). The image sensor SEN1 may provide e.g. several image frames per second, and each image frame may comprise signal values from several thousand or even from several millions pixels P0, P1, P2, P3, corresponding to different parts of the optical image IMG2 formed on the image sensor SEN1. Thus, the spectral intensity values $X_n$, $X_{n+1}$, $X_{n+2}$, $X_{n+3}$ may need to be determined for thousands or millions of different points of the optical image IMG2. Using the matrix elements (K) may provide a fast way of determining the spectral intensity values $X_n$, $X_{n+1}$, $X_{n+2}$, $X_{n+3}$.

The control unit CNT1 may calculate the calibrated spectral intensity values of spectral images IMG2$\lambda$1, IMG2$\lambda$2, ... IMG2$\lambda$N of the object OBJ1 from the recorded detector signal values, by using the calibration data (DPAR, KPAR). Each spectral image IMG2$\lambda$1, IMG2$\lambda$2, ...

IMG2$\lambda$N may comprise a two-dimensional array of calibrated spectral intensity values.

The spectral imaging device 500 may comprise a memory (e.g. MEM3) for storing recorded detector signals $S_R$, $S_G$, $S_B$, $S_{IR}$.

The spectral imaging device 500 may comprise a memory MEM3 for storing spectral images IMG2$\lambda$1, IMG2$\lambda$2, . . . IMG2$\lambda$N, which are calculated from detector signals. The spectral image IMG2$\lambda$1 may be a two-dimensional image of the object OBJ1, which represents a spectral component at first wavelength (e.g. $\lambda$1). The spectral image IMG2$\lambda$2 may be a two-dimensional image of the object OBJ1, which represents a spectral component at second different wavelength (e.g. $\lambda$2). The spectral images IMG2$\lambda$1, IMG2$\lambda$2, . . . IMG2$\lambda$N may be determined from measured detector signals by using calibration data DPAR1, KPAR2. The spectral images IMG2$\lambda$1, IMG2$\lambda$2, . . . IMG2$\lambda$N may together constitute a hyperspectral cube CIMG. The spectral imaging device 500 may also be called e.g. as a hyperspectral imager.

The spectral imaging device 500 may comprise an identifier ID1 to specify the identity of the spectral imaging device 500. The identifier ID1 may be used e.g. to associate unique calibration data with the identity of the spectral imaging device 500. The identifier ID1 may be stored e.g. in a read-only memory.

SX, SY, SZ denote orthogonal directions. The spectral imaging device 500 may have an optical axis AX1. The optical axis AX1 may be parallel with the direction SZ.

Figure 1B:
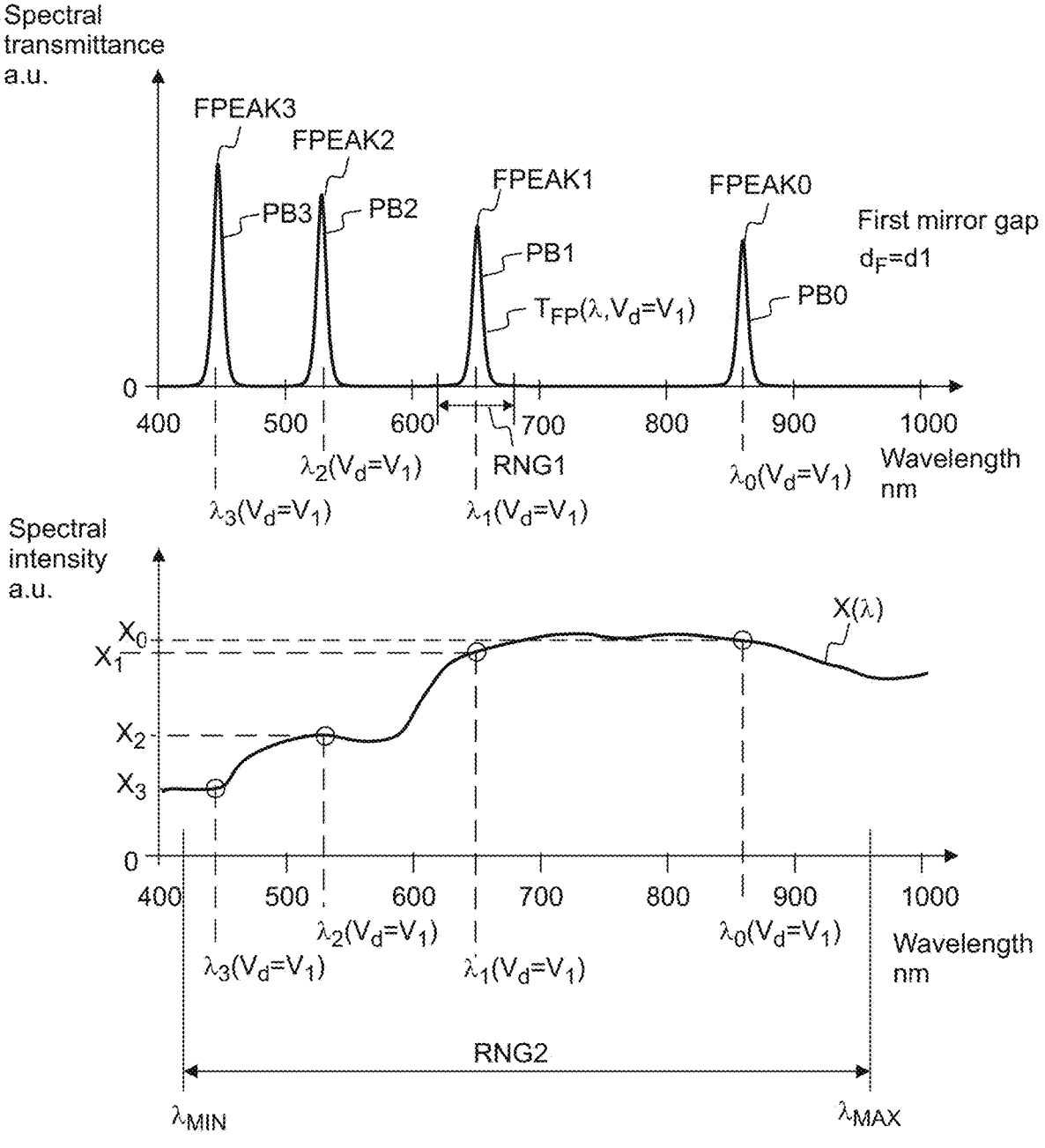
FIG. 1b shows, by way of example, a spectrum of input light, and the spectral transmittance of a Fabry-Perot interferometer.

Referring to FIG. 1*b*, the input light LB1 received from the object OBJ1 may have a spectral intensity distribution, i.e. a spectrum X($\lambda$). The spectral transmittance $T_{FP}(\lambda,V_d)$ of the Fabry-Perot interferometer may have several transmittance peaks PB0, PB1, PB2, PB3 at wavelengths $\lambda_0$, $\lambda_1$, $\lambda_2$, $\lambda_3$. Each wavelength $\lambda_0$, $\lambda_1$, $\lambda_2$, $\lambda_3$ may be a function of the control parameter $V_d$. The spectral imaging device 500 may instantaneously detect the input light LB1 only at narrow discrete spectral bands specified by the wavelengths $\lambda_0$, $\lambda_1$, $\lambda_2$, $\lambda_3$. Xo may denote the spectral intensity of the input light LB1 at the wavelength $\lambda_0$. $\lambda_1$ may denote the spectral intensity of the input light LB1 at the wavelength $\lambda_1$. $\lambda_2$ may denote the spectral intensity of the input light LB1 at the wavelength $\lambda_2$. $\lambda_3$ may denote the spectral intensity of the input light LB1 at the wavelength $\lambda_3$.

$\lambda_{MIN}$ and $\lambda_{MAX}$ denote the limits of the spectral measurement range RNG2 of the Fabry-Perot interferometer 500. RNG1 denotes a spectral range, which contains only one transmittance peak of the Fabry-Perot interferometer 500.

In an embodiment, the spectral positions $\lambda_0$, $\lambda_1$, $\lambda_2$, $\lambda_3$ of transmittance peaks of the Fabry-Perot interferometer FPI1 may be matched with the spectral sensitivities of the detector pixels P0, P1, P2, P3 of the image sensor SEN1 so that the spectral imaging device 500 can be used for fast spectral analysis at high spectral resolution. The spectral imaging device 500 may measure spectral intensities e.g. at two, three, four or five wavelengths substantially simultaneously.

FIG. 2*a* illustrates spectral scanning of the Fabry-Perot interferometer FPI1. The spectral passbands PB0, PB1, PB2, PB3 of the interferometer FPI1 may be at first spectral positions $\lambda_0(V_d=V_1)$, $\lambda_1(V_d=V_1)$, $\lambda_2(V_d=V_1)$, $\lambda_3(V_d=V_1)$ when the distance $d_F$ between the mirrors M1, M2 has a first value d1. Each passband has a peak FPEAK0, FPEAK1, FPEAK2, FPEAK3. For example, the peak FPEAK1 of the passband PB1 may be at a first wavelength $\lambda_1$ when the distance $d_F$ is eual to d1. The distance $d_F$=d1 and the wavelength $\lambda_1$ may be associated with a first control parameter value $V_d$=$V_1$.

The spectral positions Xo, $\lambda_1$, $\lambda_2$, $\lambda_3$ of the passbands PB0, PB1, PB2, PB4 of the interferometer FPI1 may be changed by changing the distance $d_F$ between the mirrors M1, M2 of the interferometer FPI1.

The spectral passbands PB0, PB1, PB2, PB3 of the interferometer FPI1 may be at second different spectral positions $\lambda_0(V_d=V_2)$, $\lambda_1(V_d=V_2)$, $\lambda_2(V_d=V_2)$, $\lambda_3(V_d=V_2)$ when the distance $d_F$ between the mirrors M1, M2 has a second different value d2. The change of the distance $d_F$ between the mirrors M1, M2 may be associated with a change of the control parameter $V_d$. For example, the peak FPEAK1 of the passband PB1 may be at a different spectral position $\lambda_1(V_d=V_2)$ when the distance $d_F$ is equal to d2. The distance $d_F$=d2 and the wavelength $\lambda_2$ may be associated with a second control parameter value $V_d$=$V_2$.

The passbands may define the spectral position and bandwidth for capturing one or more images with the image sensor SEN1.

Referring to FIG. 2*b*, the spectral transmittance $T_{FP}(\lambda,V_d)$ of the Fabry-Perot interferometer FPI1 is a function of two variables, i.e. the wavelength $\lambda$ and the control parameter $V_d$. Complete measurement of the spectral transmittance function $T_{FP}(\lambda,V_d)$ by scanning through each combination of the wavelength $\lambda$ and the control parameter $V_d$ may be time-consuming. When using the present method, it is not necessary to scan through each combination of the wavelength $\lambda$ and the control parameter $V_d$ at a calibration site.

After the spectral transmittance $T_{FP}(\lambda,V_d)$ of the Fabry-Perot interferometer FPI1 has been obtained, the spectral calibration functions $\lambda_0(V_d)$, $\lambda_1(V_d)$, $\lambda_2(V_d)$, $\lambda_3(V_d)$ may be determined from the spectral transmittance $T_{FP}(\lambda,V_d)$ by tracking the positions of the transmittance peaks in the plane defined by the wavelength dimension and the control parameter dimension.

Referring to FIG. 3*a*, the imaging optics LNS1 may form an optical image IMG2 of the object OBJ1 on the image sensor SEN1. The spectral imaging device 500 may be arranged to form an image IMG2 of the object OBJ1 on the image sensor SEN1, and spectral intensities may be measured substantially simultaneously for two or more different parts of the object OBJ1.

The spectral bandwidth and spectral position(s) of the optical image IMG2 may be defined by the spectral passbands PB0, PB1, PB2, PB3 of the interferometer FPI1. The spectrometer may capture a two-dimensional image IMG2 of an object e.g. at two or more narrow wavelength bands (i.e. transmittance peaks) of the Fabry-Perot interferometer FPI1.

The image sensor SEN1 may comprise first detector pixels P0, which are spectrally selectively sensitive to a first color. The image sensor SEN1 may comprise second detector pixels P1, which are spectrally selectively sensitive to a second color. The image sensor SEN1 may comprise third detector pixels P2, which are spectrally selectively sensitive to a third color. For example, the first detector pixels P0 may be sensitive to red light (R), the second detector pixels P1 may be sensitive to green light (G), and the third detector pixels P2 may be sensitive to blue light (B).

The image sensor SEN1 may further comprise fourth detector pixels P3, which are spectrally selectively sensitive to a fourth color. For example, the first detector pixels P0 may be sensitive to red light (R), the second detector pixels P1 may be sensitive to green light (G), the third detector pixels P2 may be sensitive to blue light (B), and the fourth detector pixels P3 may be sensitive to infrared light (IR).

The optical image IMG2 may simultaneously cover a plurality of detector pixels P0, P1, P2 in order to analyze spatial variations of optical spectrum at different points of the two-dimensional image IMG2. The image IMG2 may cover e.g. four or more adjacent pixels P0, P1,P2 in the direction SX, and four or more adjacent pixels in the direction SY.

The image sensor SEN1 may also be implemented by using several arrays of detector pixels, wherein the transmitted light LB2 may be distributed to the different arrays e.g. by beam splitters and/or spectrally selective reflectors.

Referring to FIG. 3b, the pixels P0 may have spectral quantum efficiency $Q_R(\lambda)$. The pixels P1 may have spectral quantum efficiency $Q_G(\lambda)$.The pixels P2 may have spectral quantum efficiency $Q_B(\lambda)$. The pixels P3 may have spectral quantum efficiency $Q_{IR}(\lambda)$. The efficiency $Q_G(\lambda)$ may be different from $Q_R(\lambda)$. The efficiency $Q_B(\lambda)$ may be different from $Q_R(\lambda)$ and different from $Q_G(\lambda)$. The efficiency $Q_{IR}(\lambda)$ may be different from $Q_R(\lambda)$, different from $Q_G(\lambda)$ and different from $Q_B(\lambda)$.

Figures 3C, 3D:
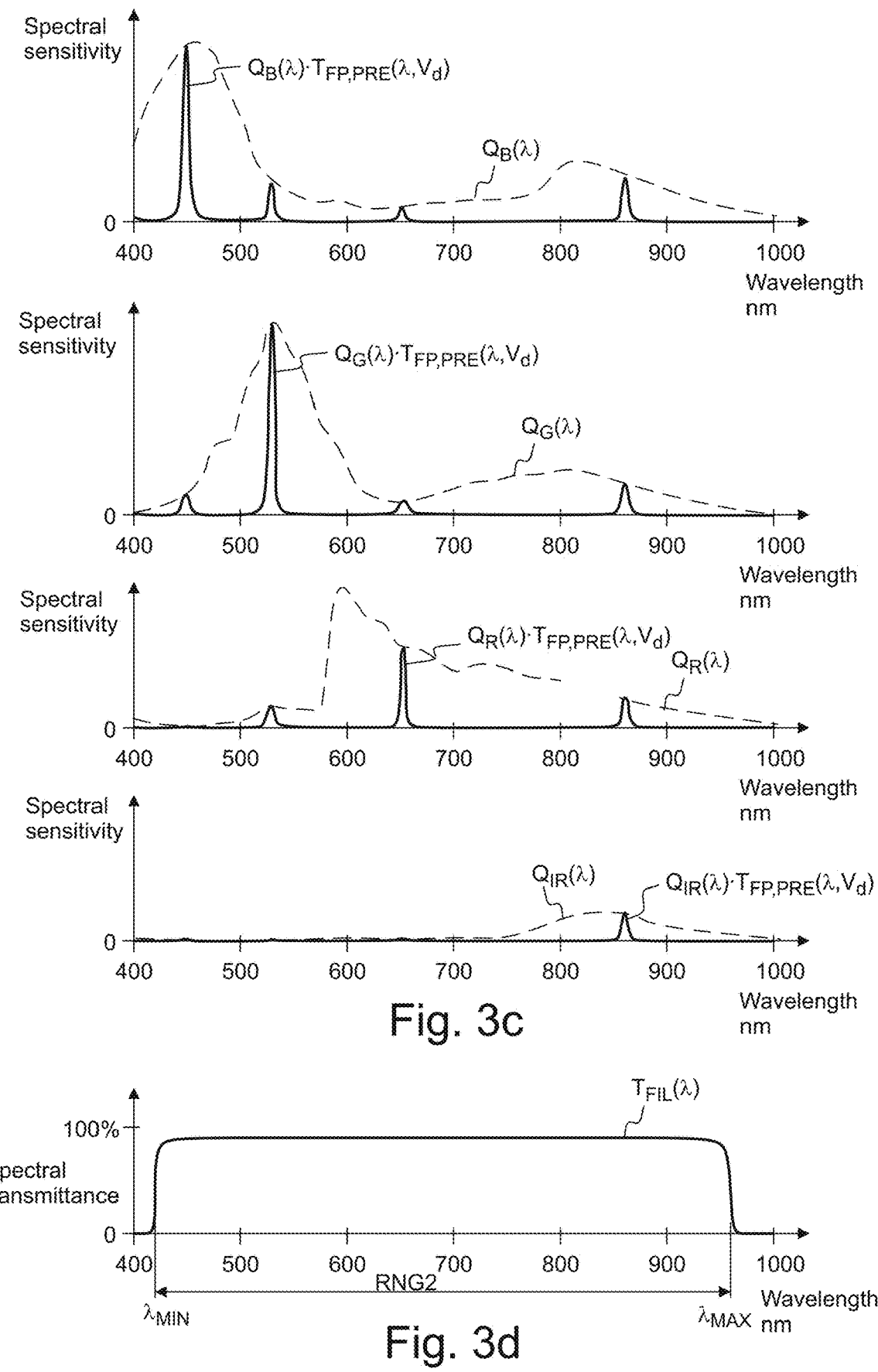
FIG. 3c shows, by way of example, spectral sensitivities of different color channels of the spectral imaging device.
FIG. 3d shows, by way of example, spectral transmittance of cut-off filters, which define the spectral measurement range of the spectral imaging device.

Referring to FIG. 3c, the spectral quantum efficiency for the combination of the pixels P0 and the Fabry-Perot interferometer FPI1 may be formed as product of the spectral transmittance function $T_{FP}(\lambda,V_d)$ of the interferometer FPI1 and the spectral quantum efficiency $Q_R(\lambda)$ of the detector pixels P0. The spectral quantum efficiency for the combination of the pixels P1 and the interferometer FPI1 may be formed as product of the spectral transmittance function $T_{FP}(\lambda,V_d)$ and the spectral quantum efficiency $Q_G(\lambda)$.The spectral quantum efficiency for the combination of the pixels P2 and the interferometer FPI1 may be formed as product of the spectral transmittance function $T_{FP}(\lambda,V_d)$ and the spectral quantum efficiency $Q_B(\lambda)$.The spectral quantum efficiency for the combination of the pixels P3 and the interferometer FPI1 may be formed as product of the spectral transmittance function $T_{FP}(\lambda,V_d)$ and the spectral quantum efficiency $Q_{IR}(\lambda)$.

Referring to FIG. 3d, the spectral imaging device 500 may comprise one or more cut-off filters FIL1, FIL2 to define the spectral measurement range RNG2 of the spectral imaging device 500. The optical components of the spectral imaging device 500 may have a combined spectral transmittance $T_{FIL}(\lambda)$. The combined spectral transmittance $T_{FIL}(\lambda)$ may represent the spectral transmittance of other optical components of the device 500 except the Fabry-Perot interferometer FPI1 and the image sensor SEN1.

Figure 4A:
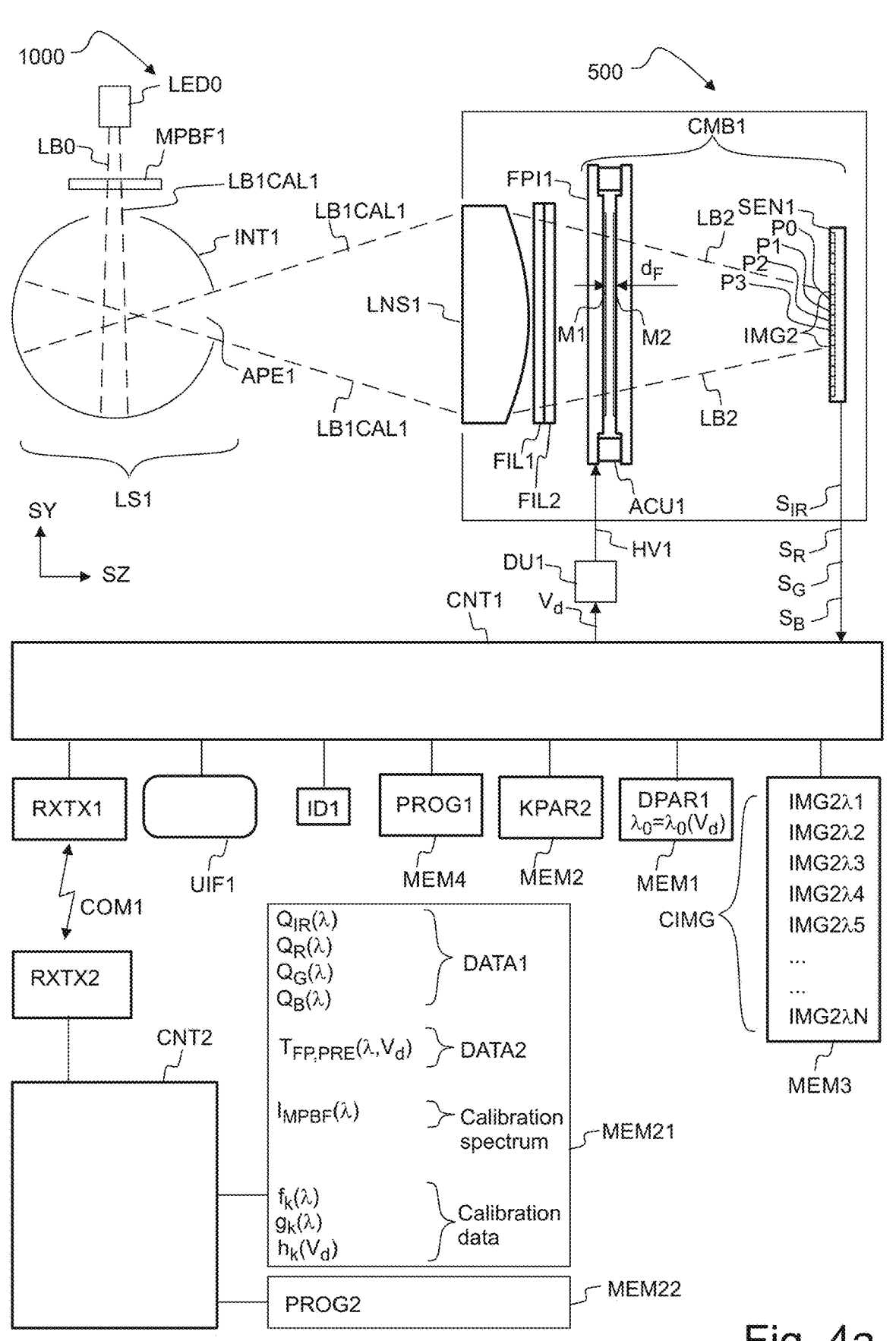
FIG. 4a shows, by way of example, an apparatus for providing first calibration light for the spectral imaging device.

Referring to FIG. 4a, a calibration apparatus 1000 may comprise a calibration light source LS1 to provide first calibration light. The apparatus 1000 may comprise a control unit CNT2 for performing the data processing operations for the calibration.

The apparatus 1000 may comprise a communication unit RXTX2 to receive and/or transmit data e.g. via communication COM1. The apparatus 1000 may communicate e.g. with a database DBASE1 e.g. via the Internet. For example, measured detector signals and/or calculated spectral images may be transmitted via the communication unit RXTX2.

The calibration apparatus 1000 may comprise:

a communication unit RXTX2 for obtaining first spectral data DATA1, which specifies spectral quantum efficiency $(Q_{IR},Q_R,Q_G,Q_B)$ of detector pixels (P0,P1,P2, P3) for an image sensor (SEN1), a communication unit RXTX2 for obtaining second spectral data DATA2, which specifies a spectral transmittance function $T_{FP,PRE}(\lambda,V_d)$ for a Fabry-Perot interferometer FPI1, a calibration light source LS1 to form first calibration light LB1CAL1, which has a first calibration spectrum, which comprises a plurality of spectral peaks (CALPEAK1, CALPEAK2, CALPEAK3), and a data processor CNT2 to determine calibration data from obtained data and from measured data.

The calibration light source LS1 may comprise a primary light source LED0 and a multi pass band filter MPBF1. The primary light source LED0 may provide broadband primary light LB0. The multi pass band filter MPBF1 may form first calibration light LB1CAL1 by filtering the broadband primary light LB0. The primary light source LED0 may be e.g. a light emitting diode or a tungsten halogen lamp. The calibration light source LS1 may optionally comprise an optical (spatial) integrator INT1 to provide uniform illumination over the field of view of the spectral imaging device 500. The integrator INT1 may comprise e.g. an integrating sphere and/or an optically diffusing surface.

The first calibration light may be provided by using a calibration light source LS1, which comprises a multi pass band filter MPBF1 and a broadband led or halogen lamp LED0. The multi pass band filter may have a plurality of spectral pass bands. For example, the number of pass bands within the range of 400 nm to 1000 nm may be e.g. in the range of 3 to 20, advantageously in the range of 7 to 12.

The spectral imaging device 500 may be assembled at an assembly line. The image sensor SEN1 may be combined with the Fabry-Perot interferometer FPI1 at the assembly line. The method may comprise forming a combination CMB1, which comprises the image sensor SEN1 and the Fabry-Perot interferometer FPI1.

The spectral imaging device 500 may be arranged to capture images (IMG2) of the calibration light source LS1. The spectral imaging device 500 may be arranged to capture images of a region, which is within an output aperture APE1 of the calibration light source LS1. The spectral imaging device 500 may be arranged to measure the spectrum of the calibration light LB1CAL1 by scanning the Fabry-Perot interferometer FPI1. The image sensor SEN1 may convert intensity values of the of the image IMG2 into detector signals $S_{IR}$, $S_R$, $S_G$, $S_B$. The apparatus 1000 may receive measured detector signals $S_{IR}$, $S_R$, $S_G$, $S_B$ from the spectral imaging device 500 e.g. via communication units RXTX1, RXTX2.

The apparatus 1000 may be arranged to:

obtain measured profiles $S_{IR,MEAS}(V_d)$, $S_{R,MEAS}(V_d)$, $S_{G,MEAS}(V_d)$, $S_{B,MEAS}(V_d)$ of the first calibration light LB1CAL1 by recording detector pixel signals $S_{IR}$, $S_R$, $S_G$, $S_B$ during scanning a control parameter $V_d$ of the Fabry-Perot interferometer, determine simulated profiles $S_{IR,SIM,k}(V_d)$, $S_{R,SIM,k}(V_d)$, $S_{G,SIM,k}(V_d)$, $S_{B,SIM,k}(V_d)$ from the spectrum $I_{MPBF}(\lambda)$ of the first calibration light LB1CAL1 by using the spectral quantum efficiencies $(Q_{IR},Q_R,Q_G,Q_B)$ of the detector pixels (P0, P1, P2, P3), by using the spectral transmittance function, $(T_{FP,PRE}(\lambda,V_d))$ and by using first calibration data $(f_k(\lambda), g_k(\lambda), h_k(V_d))$, modify the first calibration data $(f_k(\lambda), g_k(\lambda), h_k(V_d))$ until the simulated profiles $S_{IR,SIM,k}(V_d)$, $S_{R,SIM,k}(V_d)$, $S_{G,SIM,k}(V_d)$, $S_{B,SIM,k}(V_d)$ match with the corresponding measured profiles $S_{IR,MEAS}(V_d)$, $S_{R,MEAS}(V_d)$, $S_{G,MEAS}(V_d)$, $S_{B,MEAS}(V_d)$ according to one or more matching criteria (e.g. until an error indicator value is smaller than a predetermined limit), and store the modified first calibration data $(f_k(\lambda), g_k(\lambda), h_k(V_d))$ in a memory.

The apparatus 1000 may comprise a memory (e.g. MEM21) for storing first spectral data DATA1, which specifies previously measured spectral quantum efficiencies $Q_{IR}$, $Q_R$, $Q_G$, $Q_B$ of the detector pixels P0, P1, P2, P3.

The apparatus 1000 may comprise a memory (e.g. MEM21) for storing second spectral data DATA2, which specifies previously measured spectral transmittance $T_{FP,PRE}(\lambda,V_d)$ of the Fabry-Perot interferometer.

The apparatus 1000 may comprise a memory (e.g. MEM21) for storing data, which specifies the spectrum $I_{MPBF}(\lambda)$ of the calibration light LB1CAL1.

The apparatus 1000 may comprise a memory (e.g. MEM21) for storing calibration data $f_k(\lambda),g_k(\lambda),h_k(V_d)$.

The apparatus 1000 may also be arranged to calculate calibration parameters KPAR2, DPAR1 from the determined calibration data $f_k(\lambda),g_k(\lambda),h_k(V_d)$. The calibration parameters KPAR2, DPAR1 may be stored in a memory (MEM1, MEM2) of the spectral imaging device 500. The calibration parameters KPAR2, DPAR1 may be communicated to the spectral imaging device 500 e.g. via the communication units RXTX2, RXTX1.

The calibration data DPAR1 may specify a relation, which associates control signal values $V_d$ with actual wavelengths $\lambda$.

The calibration parameters KPAR2 may comprise e.g. matrix elements K. The spectral imaging device 500 may be arranged to determine one or more spectral intensity values $X(\lambda)$ as linear combinations of the measured detector signal values $S_{IR}$, $S_R$, $S_G$, $S_B$ by using the elements (K) as coefficients.

In particular, the calibration apparatus 1000 may be arranged to:

form matrix elements (U) of a first matrix (M) from the the quantum efficiencies $(Q_R,Q_G)$ of the detector pixels (P0,P1) and from the spectral transmittance function $(T_{FP,PRE}(\lambda,V_d))$ by using the modified first calibration data $(f_k,g_k,h_k)$, wherein the matrix elements (U) of the first matrix are coefficients for determining detector signals $(S_R, S_G, S_B)$ of the different color channels as linear combinations of spectral intensity values $(X_n, X_{n+1}, X_{n+2})$ of input light (LB1) at spectral positions $(\lambda_0, \lambda_1, \lambda_2)$ of spectral transmittance peaks of the Fabry-Perot interferometer (FPI1), form a second matrix $(M^\dagger)$ such that the second matrix $(M^\dagger)$ is an inverse matrix or a pseudo-inverse matrix of the first matrix (M), and output and/or store matrix elements (K) of the second matrix $(M^\dagger)$ in a memory (MEM2).

The apparatus 1000 may comprise a memory MEM22 for storing computer program PROG2. The computer program PROG2 when executed by the processor CNT2 may cause the calibration apparatus 1000 to carry out one or more steps of the calibration method.

At a later stage, the spectral imaging device may be used for measuring an unknown spectrum $X(\lambda)$. The calibration parameters KPAR2, DPAR1 may be retrieved from the memory (MEM1, MEM2), and the unknown spectrum $X(\lambda)$ may be calculated from detector signals $S_{IR}$, $S_R$, $S_G$, $S_B$ by using the previously stored calibration parameters KPAR2, DPAR1. In particular, the spectral imaging device 500 may calculate the spectral images IMG2λ1, IMG2λ2, . . . IMG2λN from the measured detector signal values $S_{IR}$, $S_R$, $S_G$, $S_B$ by using the calibration parameters KPAR2.

Figure 4B:
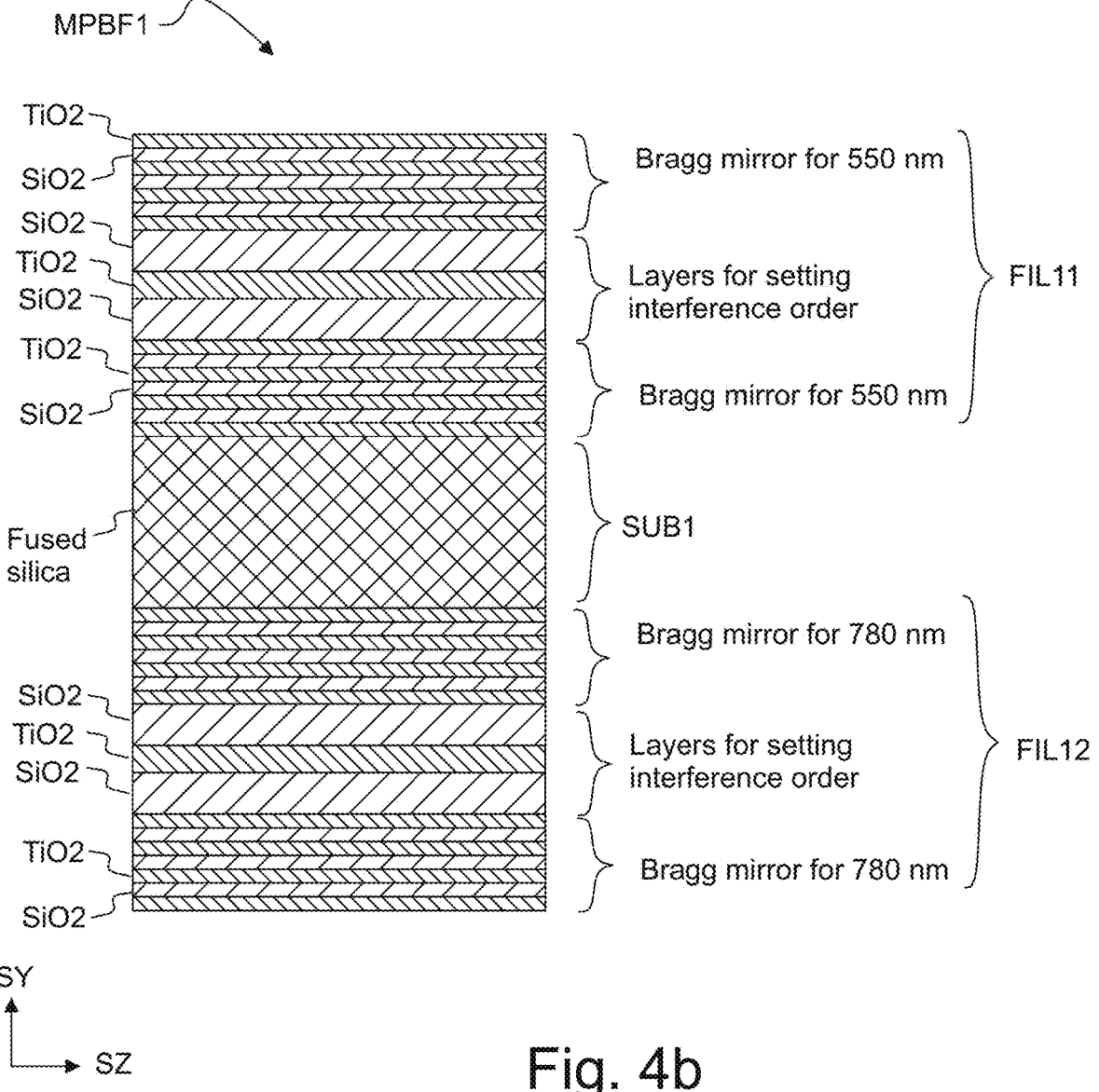
FIG. 4b shows, by way of example, in a cross-sectional side view, a multi pass band filter.

Referring to FIG. 4*b*, the multi pass band filter MPBF1 may be an interference filter. The multi pass band filter MPBF1 may be implemented by depositing a plurality of material layers on a substrate SUB1. The multi pass band filter MPBF1 may comprise e.g. a first filter FIL11 implemented on a first major surface of the substrate, and a second filter FIL12 implemented on a second major surface of the substrate. The first filter FIL11 may be arranged to provide several spectral pass bands, which are in a first spectral range (e.g. in the range of 450 nm to 650 nm). The second filter FIL12 may be arranged to provide several spectral pass bands, which are in a second spectral range (e.g. in the range of 625 nm to 850 nm). The substrate may comprise e.g. fused silica. The material layers may be e.g. silica (SiO2) and titanium dioxide (TiO2).

Figure 4C:
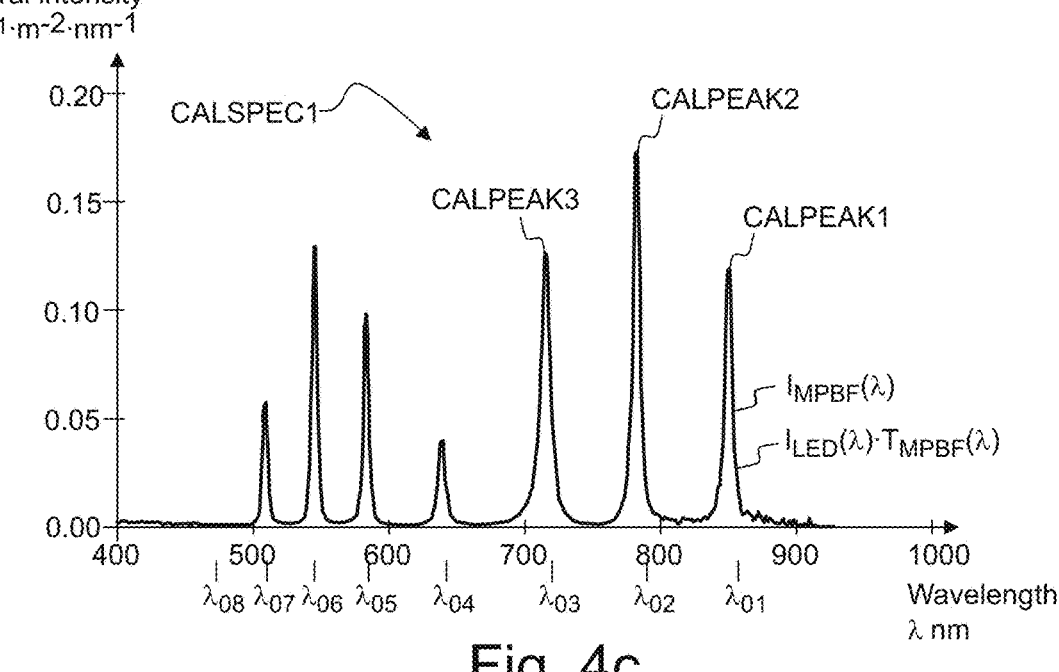
FIG. 4c shows, by way of example, forming first calibration light by filtering light of a broadband light source with the multi pass band filter.

FIG. 4*c* shows forming the first calibration light LB1CAL1 by filtering the broadband primary light LB0 with the multi pass band filter MPBF1. The uppermost curve of FIG. 4*c* shows, by way of example, the spectral intensity distribution $I_{LED}(\lambda)$ of the broadband primary light LB0.

The second curve from the top of FIG. 4*c* shows, by way of example, the spectral transmittance $T_{MPBF}(\lambda)$ of the multi pass band filter MPBF1. The multi pass band filter MPBF1 may have a plurality of passbands PB01, PB02, PB03, . . . at stable spectral positions $\lambda_{01}$, $\lambda_{02}$, $\lambda_{03}$, . . .

The lowermost curve of FIG. 4*c* shows, by way of example, the spectral intensity distribution $I_{MPBF}(\lambda)$ of first calibration light LB1CAL1 formed by filtering the primary light LB0 with the filter MPBF1. The spectral intensity distribution $I_{MPBF}(\lambda)$ may be formed as the product $I_{LED}(\lambda) \cdot T_{MPBF}(\lambda)$. The spectral intensity distribution $I_{MPBF}(\lambda)$ may also be called as a first calibration spectrum CALSPEC1. The first calibration spectrum CALSPEC1 may comprise a plurality of calibration peaks CALPEAK1, CALPEAK2, CALPEAK3, . . . at the stable spectral positions $\lambda_{01}$, $\lambda_{02}$, $\lambda_{03}$, . . .

In an embodiment, the multi pass band filter may be optionally tilted in order to provide additional spectral peaks for calibration light. By rotating the multi pass band filter, it may be possible to provide additional spectral peaks for performing the calibration. The multi pass band filter may be tilted with respect to the direction of propagation of light. Calibration measurements may optionally be performed at several different tilt angles of the multi pass band filter. Changing the tilt angle may provide additional narrow spectral bands for the calibration. By varying the tilt angle, the number of different spectral bands used for the calibration may be e.g. in the range of 50 to 500.

Figure 5A:
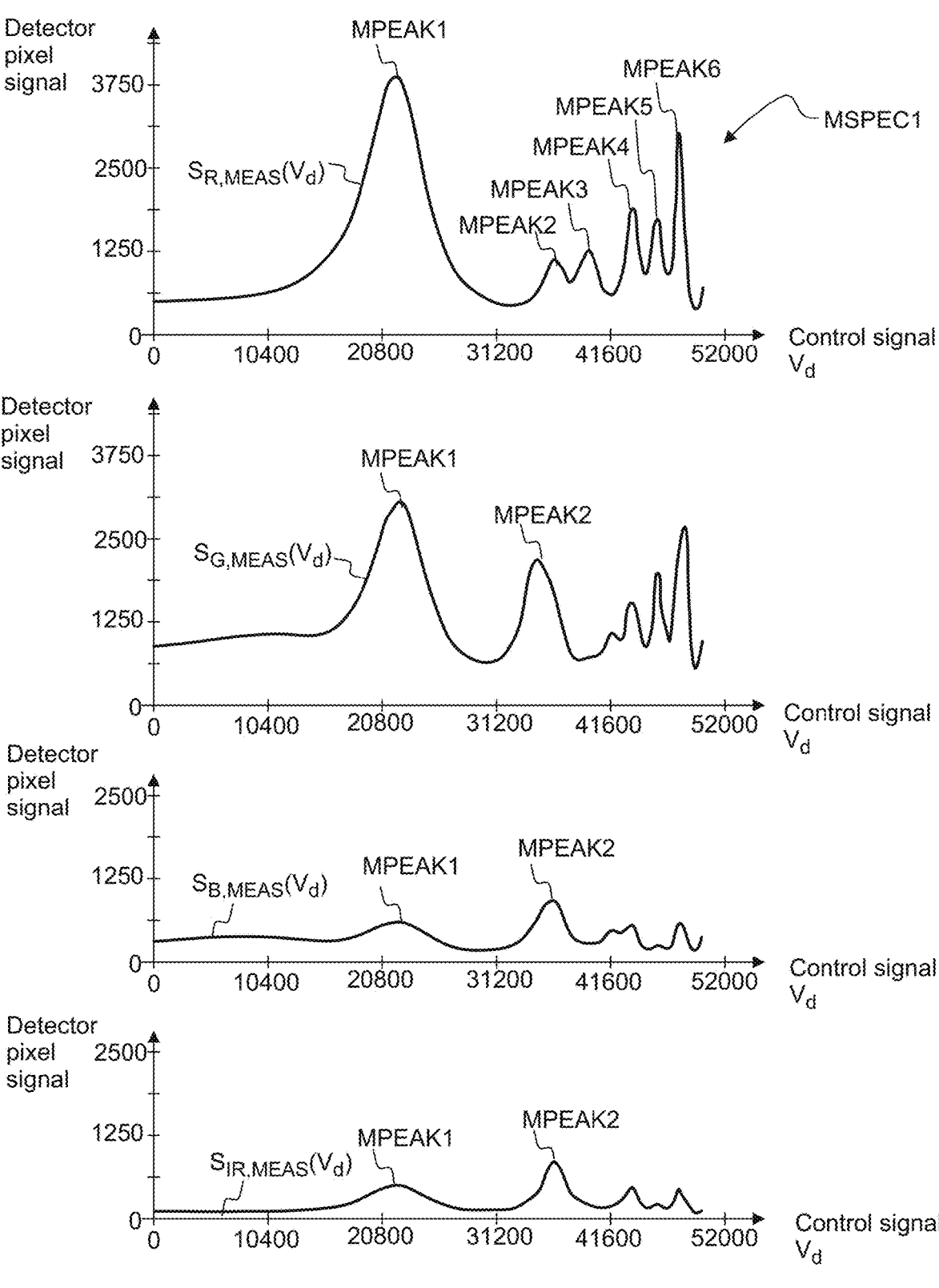
FIG. 5a shows, by way of example, measured signal profiles obtained by measuring the first calibration light with the spectral imaging device.

Referring to FIG. 5*a*, the first calibration light LB1 CAL may be coupled to the spectral imaging device 500, and the spectral imaging device 500 may provide a measured spectrum MSPEC1 by varying the distance $d_F$ between the mirrors M1, M2 of the Fabry-Perot interferometer, and by recording the signal $(S_R, S_G, S_B, S_{IR})$ of one or more detector pixels as a function of the control parameter $V_d$. The control parameter $V_d$ may be indicative of the distance $d_F$.

The uppermost curve of FIG. 5*a* shows, by way of example, the measured signal $S_{R,MEAS}(V_d)$ obtained from a detector pixel of a first color channel (red) of the spectral imaging device 500, as a function of the control parameter $V_d$. The signal $S_{R,MEAS}(V_d)$, measured as the function of the control parameter $V_d$ may also be called as the measured spectral profile MSPEC1. The measured spectral profile $S_{R,MEAS}(V_d)$ may comprise a plurality of peaks MPEAK1, MPEAK2, MPEAK3, . . . MPEAK6.

The calibration light LB1CAL1 may have a spectral intensity distribution $I_{MPBF}(\lambda)$. The profiles $S_{R,MEAS}(V_d)$, $S_{G,MEAS}(V_d)$, $S_{B,MEAS}(V_d)$, $S_{IR,MEAS}(V_d)$ may be formed as follows:

$$S_{R,MEAS}(V_d) = \int_{\lambda_{MIN}}^{\lambda_{MAX}} Q_{R,A}(\lambda)T_{FP,A}(\lambda, V_d)T_{FIL}(\lambda)I_{MPBF}(\lambda)d\lambda \tag{1a}$$

-continued $$S_{G,MEAS}(V_d) = \int_{\lambda_{MIN}}^{\lambda_{MAX}} Q_{G,A}(\lambda) T_{FP,A}(\lambda,\ V_d) T_{FIL}(\lambda) I_{MPBF}(\lambda) d\lambda \qquad (1b)$$

$$S_{B,MEAS}(V_d) = \int_{\lambda_{MIN}}^{\lambda_{MAX}} Q_{B,A}(\lambda) T_{FP,A}(\lambda,\ V_d) T_{FIL}(\lambda) I_{MPBF}(\lambda) d\lambda \qquad (1c)$$

$$S_{IR,MEAS}(V_d) = \int_{\lambda_{MIN}}^{\lambda_{MAX}} Q_{IR,A}(\lambda) T_{FP,A}(\lambda,\ V_d) T_{FIL}(\lambda) I_{MPBF}(\lambda) d\lambda \qquad (1d)$$

$\lambda_{MIN}$ and $\lambda_{MAX}$ denote the low limit and the high limit of the spectral measurement range RNG2 of the spectral imaging device 500. The range RNG2 includes all spectral components which can be detected by the spectral imaging device 500. The measurement range RNG2 may also refer to the spectral integration range RNG2 from $\lambda_{MIN}$ to $\lambda_{MAX}$.

$I_{MPBF}(\lambda)$ denotes the spectral intensity distribution of the first calibration light. $Q_{R,A}(\lambda)$, $Q_{G,A}(\lambda)$, $Q_{B,A}(\lambda)$, $Q_{IR,A}(\lambda)$ denote the actual spectral quantum efficiency of the detector pixels, P0, P1, P2, P3. $T_{FP,A}(\lambda,V_d)$ denotes the actual spectral transmittance of the Fabry-Perot interferometer. $T_{FIL}(\lambda)$ represents the combined spectral transmittance of the other optical components of the spectral imaging device 500, including one or more cut-off filters FIL1, FIL2, which define the limits $\lambda_{MIN}$ and $\lambda_{MAX}$.

The first color channel of the spectral imaging device 500 may have a combined spectral response function $Q_{R,500}(\lambda)$, which is equal to the product $Q_{R,A}(\lambda) \cdot T_{FP,A}(\lambda,V_d) \cdot T_{FIL}(\lambda)$. The detector signal $S_{R,MEAS}(V_d)$ of the first color channel is formed as the integral of the product $Q_{R,500}(\lambda) \cdot I_{MPBF}(\lambda)$ over the measurement range RNG2.

The second curve from the top of FIG. 5a shows, by way of example, the measured signal $S_{G,MEAS}(V_d)$ obtained from a detector pixel of a second color channel (green) of the spectral imaging device 500, as a function of the control parameter $V_d$.

The third curve from the top of FIG. 5a shows, by way of example, the measured signal $S_{B,MEAS}(V_d)$ obtained from a detector pixel of a third color channel (blue) of the spectral imaging device 500, as a function of the control parameter $V_d$.

The lowermost curve of FIG. 5a shows, by way of example, the measured signal $S_{IR,MEAS}(V_d)$ obtained from a detector pixel of a fourth color channel (infrared) of the spectral imaging device 500, as a function of the control parameter $V_d$.

Figure 5B:
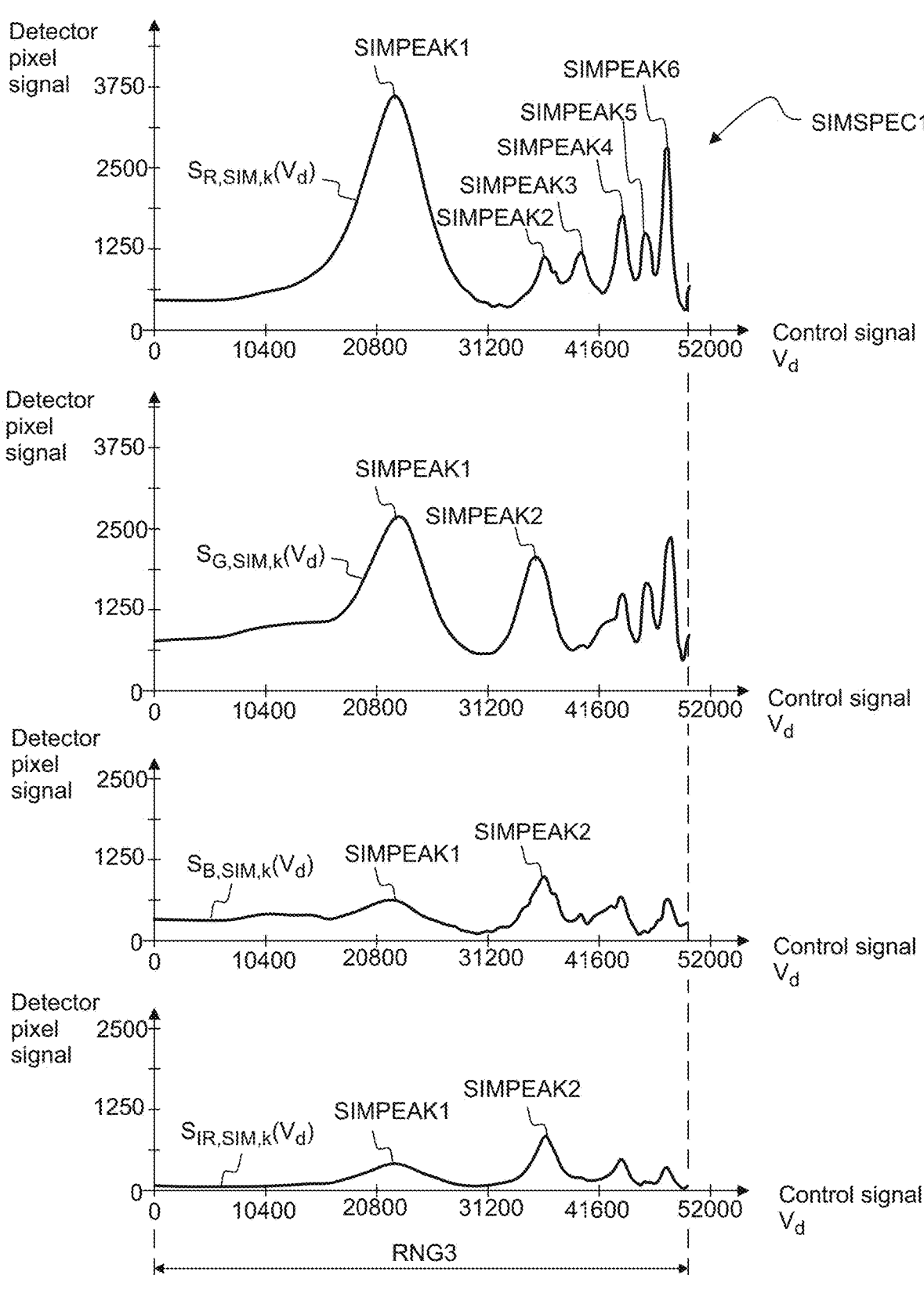
FIG. 5b shows, by way of example, simulated signal profiles calculated from the spectrum of the first calibration light, by using the simulated spectral response of the combination of the Fabry-Perot interferometer and the detector pixels.

Referring to FIG. 5b, the calibration apparatus 1000 may be arranged to calculate simulated profiles $S_{R,SIM,k}(V_d)$ from the known spectrum $I_{MPBF}(\lambda)$ by using previously measured spectral quantum efficiency $Q_R(\lambda)$ of detector pixels and by using previously measured spectral transmittance $T_{FP,PRE}(\lambda,V_d)$ of a Fabry-Perot interferometer 500.

The previously measured functions $Q_R(\lambda)$, $Q_G(\lambda)$, $Q_B(\lambda)$, $Q_{IR}(\lambda)$, $T_{FP,PRE}(\lambda,V_d)$ may represent the assembled spectral imaging device 500 to some degree, but not accurately.

The simulated spectral profiles for the different colour channels of the spectral imaging device may be initially (index k=0):

$$S_{R,SIM,k=0}(V_d) = \int_{\lambda_{MIN}}^{\lambda_{MAX}} Q_R(\lambda) T_{FP,PRE}(\lambda,\ V_d) T_{FIL}(\lambda) I_{MPBF}(\lambda) d\lambda \qquad (2a)$$

$$S_{G,SIM,k=0}(V_d) = \int_{\lambda_{MIN}}^{\lambda_{MAX}} Q_G(\lambda) T_{FP,PRE}(\lambda,\ V_d) T_{FIL}(\lambda) I_{MPBF}(\lambda) d\lambda \qquad (2b)$$

-continued $$S_{B,SIM,k=0}(V_d) = \int_{\lambda_{MIN}}^{\lambda_{MAX}} Q_B(\lambda) T_{FP,PRE}(\lambda,\ V_d) T_{FIL}(\lambda) I_{MPBF}(\lambda) d\lambda \qquad (2c)$$

$$S_{IR,SIM,k=0}(V_d) = \int_{\lambda_{MIN}}^{\lambda_{MAX}} Q_{IR}(\lambda) T_{FP,PRE}(\lambda,\ V_d) T_{FIL}(\lambda) I_{MPBF}(\lambda) d\lambda \qquad (2d)$$

The uppermost curve of FIG. 5b shows, by way of example, the simulated profile $S_{R,SIM,k}(V_d)$ (SIMSPEC1) for the detector pixels of the first color channel (red) of the spectral imaging device, in a hypothetical situation where the calibration light coupled to the spectral imaging device has the known spectral intensity distribution $I_{MPBF}(\lambda)$. The simulated $S_{R,SIM,k}(V_d)$ (SIMSPEC1) has a plurality of peaks SIMPEAK1, SIMPEAK2, SIMPEAK3, . . . SIMPEAK6.

RNG3 denotes a scanning range of the control parameter $V_d$.

The second curve from the top of FIG. 5b shows, by way of example, the simulated profile $S_{G,SIM,k}(V_d)$ for detector pixels of the second color channel (green).

The third curve from the top of FIG. 5b shows, by way of example, the simulated profile $S_{B,SIM,k}(V_d)$ for detector pixels of the third color channel (blue).

The lowermost curve of FIG. 5b shows, by way of example, the simulated profile $S_{IR,SIM,k}(V_d)$ for detector pixels of the fourth color channel (infrared).

A spectral scale of the spectral imaging device 500 may be defined e.g. by the function $\lambda_0(V_d)$, which defines the relation between the control parameter values $V_d$ and the corresponding wavelengths $\lambda_0$ of a transmittance peak of the Fabry-Perot interferometer. The spectral scale $\lambda_0(V_d)$ may be determined e.g. by comparing one or more measured spectral profiles of FIG. 5a with the corresponding simulated spectral profiles of FIG. 5b. A measured spectral profile of a color channel may be compared with the simulated spectral profile of said color channel. $S_{R,MEAS}(V_d)$ may be compared with $S_{R,SIM,k}(V_d)$. $S_{G,MEAS}(V_d)$ may be compared with $S_{G,SIM,k}(V_d)$. $S_{B,MEAS}(V_d)$ may be compared with $S_{B,SIM,k}(V_d)$. $S_{IR,MEAS}(V_d)$ may be compared with $S_{IR,SIM,k}(V_d)$.

Figure 6A:
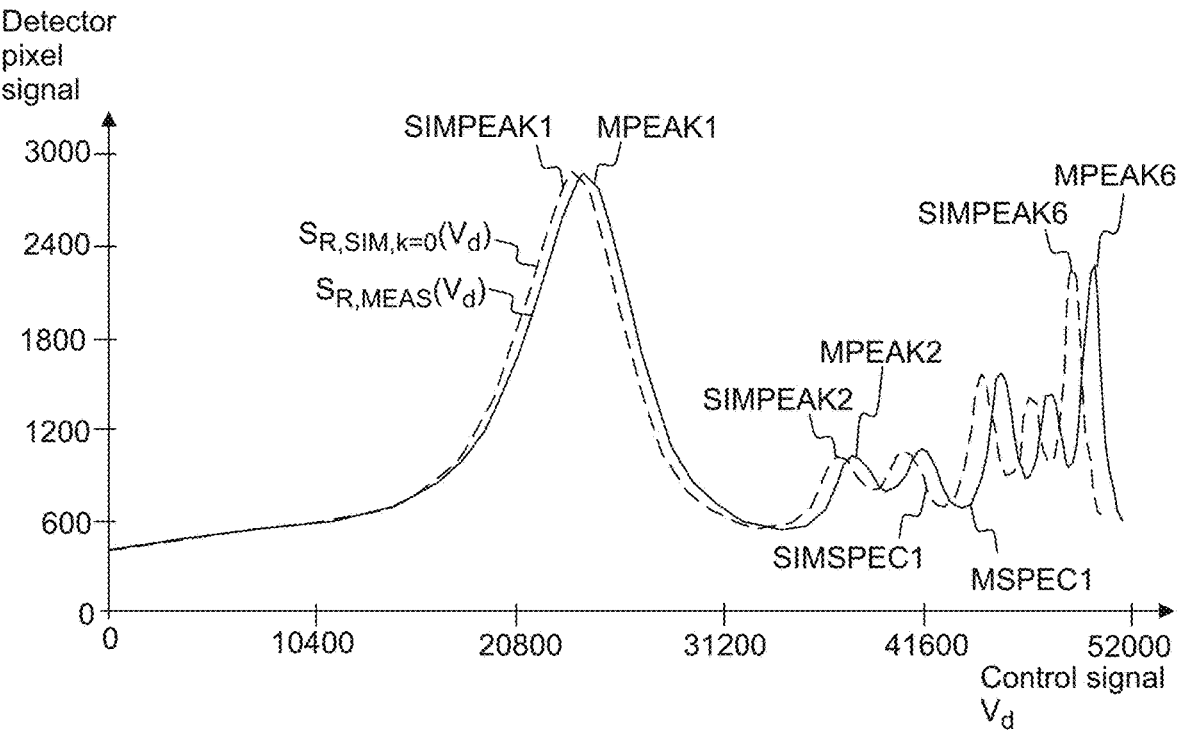
FIG. 6a shows, by way of example, an initial measured signal profile and an initial simulated signal profile.

Referring to FIG. 6a, an initial simulated profile SIMSPEC1 may significantly deviate from a corresponding measured profile MSPEC1.

The initial simulated profile SIMSPEC1 may comprise several peaks SIMPEAK1, SIMPEAK2, . . . SIMPEAK6. The simulated profile SIMSPEC1 may represent the simulated detector signal $S_{R,SIM,k=0}(V_d)$ as the function of the control signal $V_d$.

The measured profile MSPEC1 may comprise several peaks MPEAK1, MPEAK2, . . . MPEAK6. The measured profile MSPEC1 may represent the measured detector signal $S_{R,MEAS}(V_d)$ as the function of the control signal $V_d$.

Figure 6B:
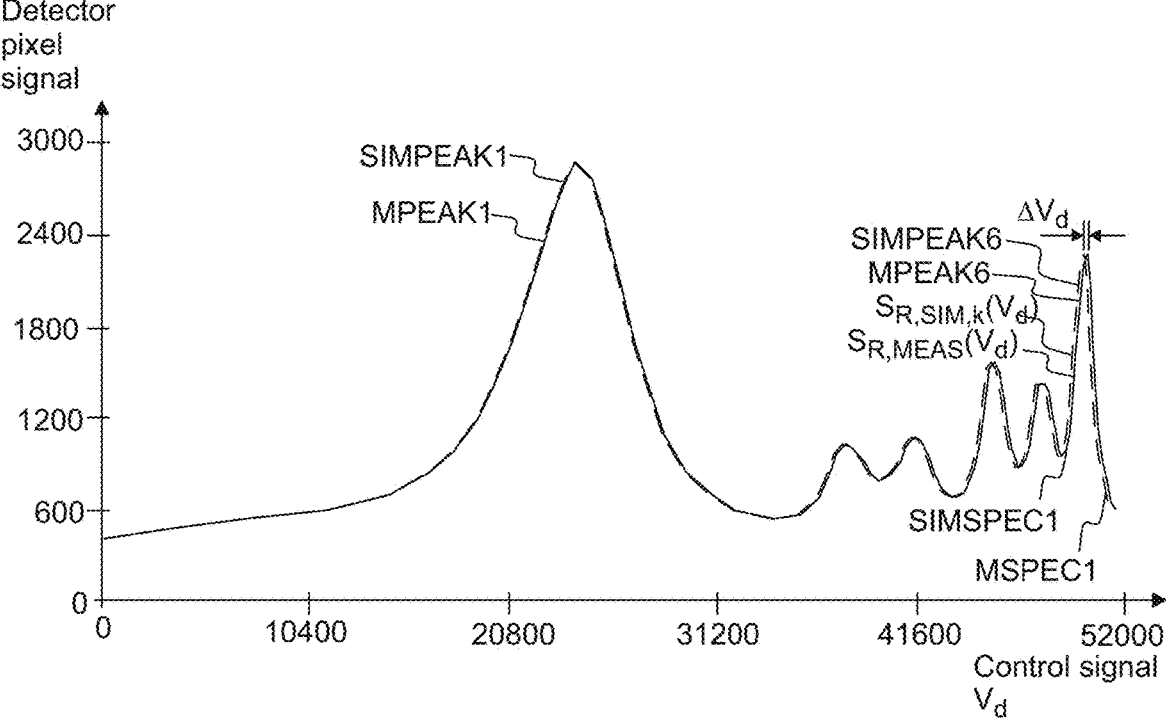
FIG. 6b shows, by way of example, a modified measured signal profile and the initial simulated signal profile.

Referring to FIG. 6b, the calibration data may be iteratively modified until the simulated profiles (e.g. $S_{R,SIM,k}$) match with the corresponding measured profiles (e.g. $S_{R,MEAS}(V_d)$) according to one or more matching criteria.

The peaks SIMPEAK1, SIMPEAK2, . . . SIMPEAK6 of the simulated profile SIMSPEC1 may coincide with the peaks MSPEC1, MSPEC2, . . . MSPEC6 of the measured profile MSPEC1, after the calibration data has been determined.

The iteration may be stopped when the simulated profiles (e.g. $S_{R,SIM,k}$) match with the corresponding measured profiles (e.g. $S_{R,MEAS}(V_d)$) according to one or more matching criteria. In an embodiment, the profiles do not need to match perfectly. A small deviation between the profilers may be allowed. $\Delta V_d$ denotes a difference between the positions of corresponding peaks (e.g. SIMPEAK6, MPEAK6).

The method may comprise modifying an estimated spectral transmittance $T_{FP,MOD,k}(\lambda,V_d)$ of the Fabry-Perot interferometer until the simulated profiles correspond to the measured profiles to a sufficient degree.

The method may comprise iteratively modifying the estimated spectral transmittance $T_{FP,MOD,k}(\lambda,V_d)$ of the Fabry-Perot interferometer until the simulated profiles correspond to the measured profiles to a sufficient degree. The symbol k may denote the index of an iteration cycle.

After a best estimate $T_{FP,FIT}(\lambda,V_d)$ of the spectral transmittance of the Fabry-Perot interferometer has been found, then the calibration parameters corresponding to the best estimate $T_{FP,FIT}(\lambda,V_d)$ may be determined, stored, and used for calculating calibrated spectral intensity values from measured detector signals obtained from the image sensor.

Figure 7A:
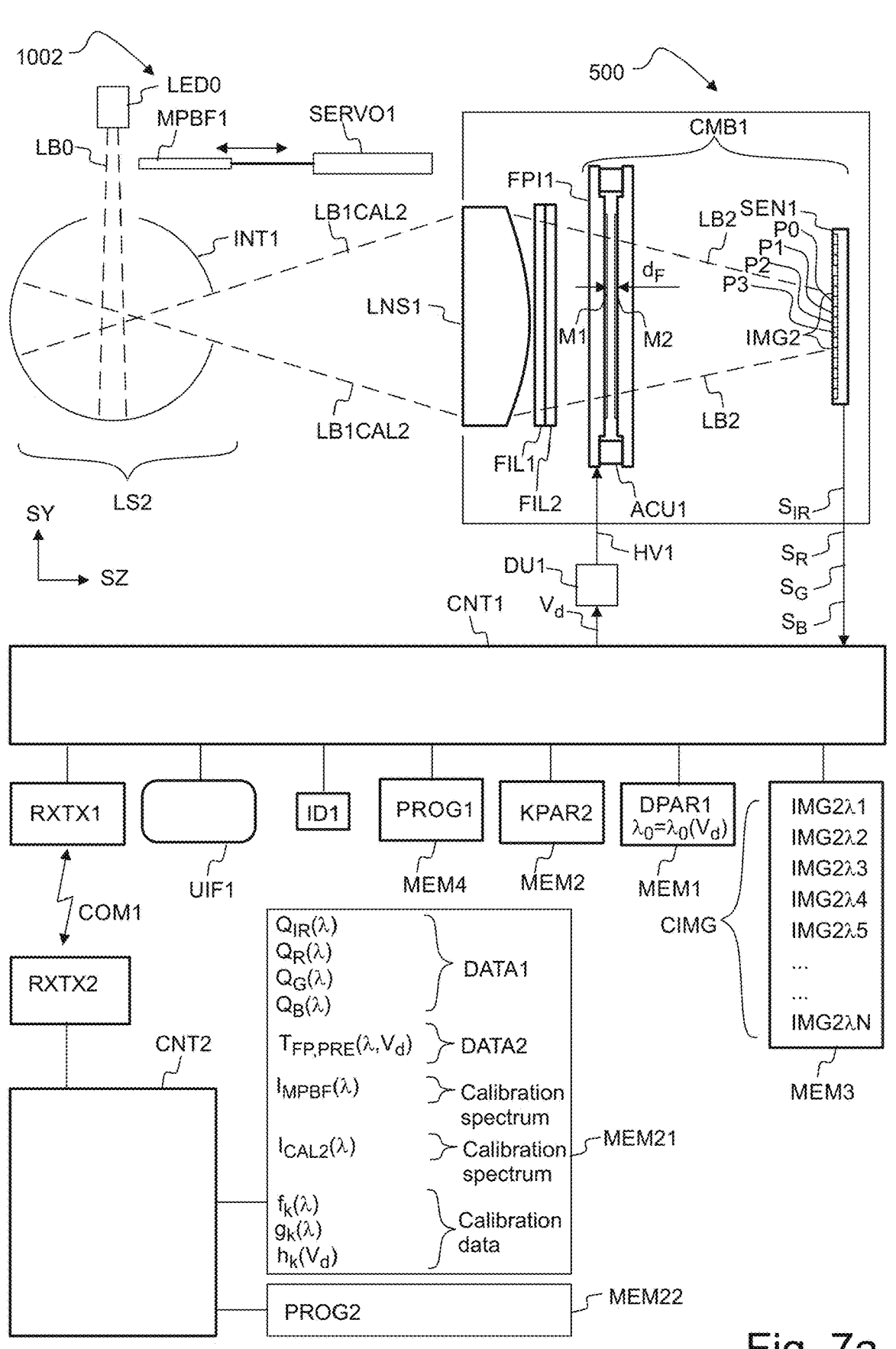
FIG. 7a shows, by way of example, an apparatus for providing second calibration light for the spectral imaging device.
Figure 7B:
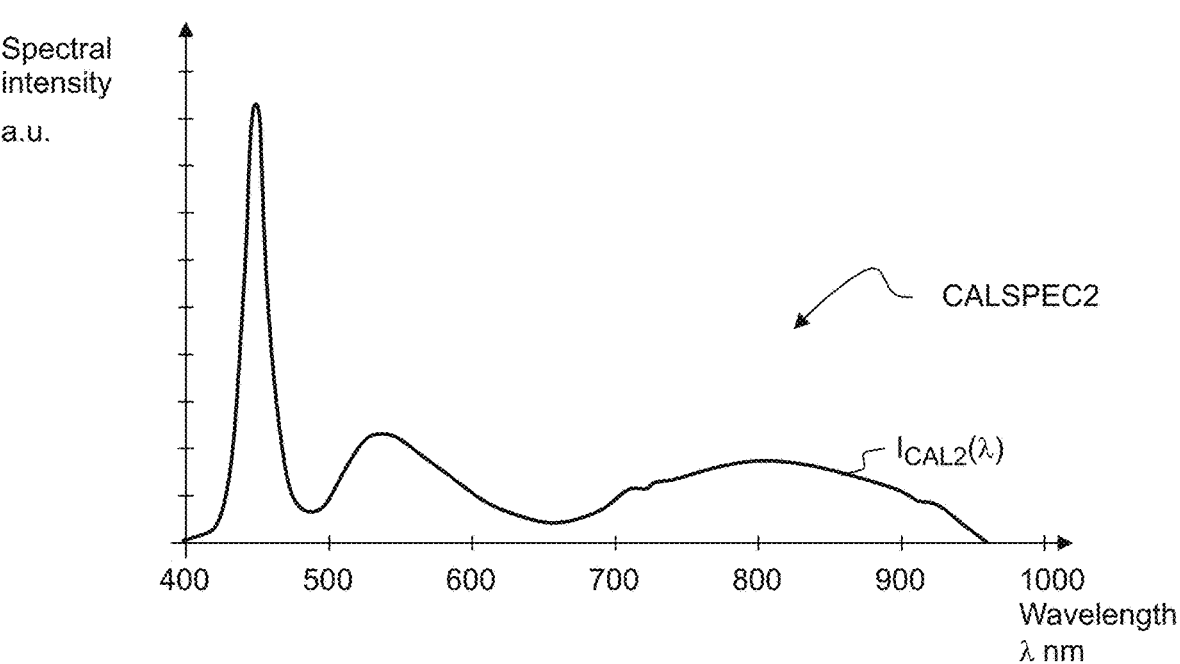
FIG. 7b shows a spectral intensity distribution of second calibration light.

Referring to FIG. 7$a$, the method may optionally comprise providing second calibration light LB1CAL2, which has a broad spectral bandwidth. A second calibration apparatus 1002 may be arranged to provide the second calibration light LB1CAL2. The second calibration apparatus 1002 may provide second calibration light LB1CAL2 without using a multi pass band filter MPBF1.

The second calibration light LB1CAL2 may be used for determining the combined spectral responses of the different color channels with improved accuracy.

The calibration apparatus 1002 may e.g. comprise the features of the apparatus 1000 shown in FIG. 4$a$, wherein the calibration apparatus 1002 may optionally comprise an actuator SERVO1 for positioning the multi pass band filter MPBF1 to the optical path and/or for positioning the multi pass band filter MPBF1 away from the optical path. Thus, the calibration apparatus 1002 may be arranged to provide first calibration light or second calibration light, depending on the position of the multi pass band filter MPBF1. The first calibration light may be changed into the second calibration light by positioning the multi pass band filter MPBF1 away from the optical path with the actuator SERVO1.

The light source LS2 of the apparatus 1002 may comprise a primary light source LED0, an integrator INT1, and a multi pass band filter MPBF1. The light source LS2 may be arranged to provide first calibration light with the multi pass band filter MPBF1 during a first period of time, and the light source LS2 may be arranged to provide second calibration light without the multi pass band filter MPBF1 during a second period of time.

Referring to FIG. 7$b$, the spectral intensity distribution $I_{CAL2}(\lambda)$ of the second calibration light LB1CAL2 may be substantially similar to the spectral intensity distribution $I_{LED}(\lambda)$ of the primary light source LED0. The spectral intensity distribution $I_{LED}(\lambda)$ may also be called as a second calibration spectrum CALSPEC2.

The second calibration light LB1CAL2 may be coupled to the spectral imaging device 500, and the spectral imaging device 500 may provide a second set of measured profiles MSPEC2 by varying the distance $d_F$ between the mirrors M1, M2 of the Fabry-Perot interferometer, and by recording the signal ($S_R$, $S_G$, $S_B$, $S_{IR}$) of one or more detector pixels as a function of the control parameter $V_d$.

The calibration apparatus 1000 (and/or 1002) may be arranged to calculate simulated profiles $S_{R,SIM,k}(V_d)$, $S_{G,SIM,k}(V_d)$, $S_{B,SIM,k}(V_d)$, $S_{IR,SIM,k}(V_d)$ based on previously measured data $Q_R(\lambda)$, $Q_R(\lambda)$, $Q_R(\lambda)$, $Q_R(\lambda)$, $T_{FP,PRE}(\lambda,V_d)$, and based on the known spectrum $I_{MPBF}(\lambda)$ and/or $I_{CAL2}(\lambda)$.

The calibration apparatus 1000 (and/or 1002) may be arranged to modify calibration parameters so that the simulated profiles correspond to the measured profiles to a sufficient degree.

The calibration apparatus 1000 (and/or 1002) may be arranged to modify calibration parameters so that the simulated profiles correspond to the measured profiles to a sufficient degree.

The calibration apparatus 1000 (and/or 1002) may be arranged to iteratively modify calibration parameters until the simulated profiles correspond to the measured profiles to a sufficient degree.

The calibration method will next be described in a detailed manner for three color channels. The calibration may be performed e.g. for red, green and blue color channels. However, the calibration method may also be used when the number of the color channels is e.g. in the range of 2 to 10. The number of the color channels may be e.g. 2, 3, 4, or 5. The color channels may be specified e.g. by a symbol $c \in \{R, G, B, IR\}$. The spectral imaging device may comprise detector pixels for providing further color channels, e.g. fourth detector pixels for detecting an infrared band. The calibration may be performed e.g. for red (R), green (G), blue (B), and infrared (IR) color channels. The spectral imaging device may comprise detector pixels for providing a higher number of color channels, e.g. fourth detector pixels for detecting a first infrared band, and fifth detector pixels for detecting a second infrared band.

When capturing images of a spatially uniform light source, several pixels may provide detector signals, which represent the same spectrum. One or more first detector pixels may provide a first detector signal of a first color channel. One or more second detector pixels may provide a second detector signal of a second color channel. One or more third detector pixels may provide a third detector signal of a third color channel.

The measured spectral profiles $S_{R,MEAS}(V_d)$, $S_{G,MEAS}(V_d)$, $S_{B,MEAS}(V_d)$ may be formed according to the equations (1$a$), (1$b$), 1$c$), as discussed above with reference to FIG. 5$a$.

The measured spectral profiles specify the measured magnitude of the detector signal $S_{c,MEAS}$ as the function of the control parameter $V_d$. The spectral profiles $S_{R,MEAS}(V_d)$, $S_{G,MEAS}(V_d)$, $S_{B,MEAS}(V_d)$, may be measured by varying the control signal $V_d$ and by recording the magnitude of the detector signal of the first color channel R as the function of the control parameter $V_d$, by recording the magnitude of the detector signal of the second color channel G as the function of the control parameter $V_d$, and by recording the magnitude of the detector signal of the third color channel B as the function of the control parameter $V_d$.

Scanning of the Fabry-Perot interferometer comprises varying the control signal $V_d$, wherein varying the control signal $V_d$ is associated with a mechanical movement of a mirror of the Fabry-Perot interferometer.

The measured spectral profiles $S_{R,MEAS}(V_d)$, $S_{G,MEAS}(V_d)$, $S_{B,MEAS}(V_d)$ may cover a scanning range RNG3 of the control signal $V_d$, from a minimum value $V_{d,MIN}$ to a maximum value $V_{d,MAX}$. The scanning range RNG3 may be divided into scanning steps, wherein the number of the scanning steps covering the whole range RNG3 may be e.g. in the range of 100 to 10000. The spectral profiles $S_{R,MEAS}(V_d)$, $S_{G,MEAS}(V_d)$, $S_{B,MEAS}(V_d)$ may be measured at each control signal value $V_d$ determined by a scanning step of the range RNG3.

Scanning of the Fabry-Perot interferometer takes some time, but the spectral profiles $S_{R,MEAS}(V_d)$, $S_{G,MEAS}(V_d)$, $S_{B,MEAS}(V_d)$ may be measured by varying only one parameter at the calibration site, namely the control signal $V_d$.

When using the present calibration method, it is not necessary to spend time for scanning the wavelength $\lambda$ of monochromatic calibration light at the assembly line.

The simulated spectral profiles for the different colour channels of the spectral imaging device may be formed e.g. according to the equations (2a), (2b), (2c), $$S_{R,SIM,k=0}(V_d) = \int_{\lambda_{MIN}}^{\lambda_{MAX}} Q_R(\lambda)T_{FP,PRE}(\lambda, V_d)T_{FIL}(\lambda)I_{MPBF}(\lambda)d\lambda \qquad (2a)$$

$$S_{G,SIM,k=0}(V_d) = \int_{\lambda_{MIN}}^{\lambda_{MAX}} Q_G(\lambda)T_{FP,PRE}(\lambda, V_d)T_{FIL}(\lambda)I_{MPBF}(\lambda)d\lambda \qquad (2b)$$

$$S_{B,SIM,k=0}(V_d) = \int_{\lambda_{MIN}}^{\lambda_{MAX}} Q_B(\lambda)T_{FP,PRE}(\lambda, V_d)T_{FIL}(\lambda)I_{MPBF}(\lambda)d\lambda \qquad (2c)$$

These (same) equations were also mentioned with reference to FIG. 5b.

The measured spectral profiles specify the measured magnitude of the detector signal $S_{c,MEAS}$ as the function of the control parameter $V_d$.

The previously measured spectral transmittance function $T_{FP,PRE}$ specifies the transmittance of the Fabry-Perot interferometer as a function of two variables $\lambda$ and $V_d$. Measuring the function $T_{FP,PRE}$ for each combination of the variables $\lambda$ and $V_d$ is time-consuming. Thanks to the present method, there is no need to measure the function $T_{FP,PRE}$ at the assembly line. The Fabry-Perot interferometer may even be separate from the image sensor when measuring the spectral transmittance data $T_{FP,PRE}(\lambda,V_d)$, and when measuring the quantum efficiency data $Q_R(\lambda)$, $Q_G(\lambda)$, $Q_B(\lambda)$.

Obtaining the previously and separately measured spectral transmittance data $T_{FP,PRE}(\lambda,V_d)$ and quantum efficiency data $Q_R(\lambda)$, $Q_G(\lambda)$, $Q_B(\lambda)$, and subsequently performing the calibration by using the first calibration light may significantly speed up production rate of the assembled spectral imaging devices.

The spectral transmittance data $T_{FP,PRE}(\lambda,V_d)$ may be obtained e.g. by using a first measuring apparatus (1003, see FIG. 10) in a measuring laboratory. The first measuring apparatus may be separate or remote from the assembly line, which is used for assembling the spectral imaging device. The spectral transmittance function $T_{FP,PRE}$ may be obtained e.g. by scanning the wavelength $\lambda$ of monochromatic calibration light over a spectral range RNG2, and by scanning the control signal $V_d$ over a scanning range RNG3. The range RNG2 may be divided into scanning steps, wherein the number of the scanning steps covering the whole range RNG2 may be e.g. in the range of 100 to 100000. The range RNG3 may be divided into scanning steps, wherein the number of the scanning steps covering the whole range RNG3 may be e.g. in the range of 100 to 10000. When obtaining the spectral transmittance data $T_{FP,PRE}(\lambda, V_d)$, the spectral transmittance $T_{FP,PRE}(\lambda,V_d)$ may be measured at each wavelength $\lambda$ determined by a scanning step of the range RNG2, and at each control signal value $V_d$ determined by a scanning step of the range RNG3.

$Q_R(\lambda)$, $Q_G(\lambda)$, $Q_B(\lambda)$ denote the (previously measured) quantum efficiencies of the different color channels c of the spectral imaging device. The quantum efficiency data $Q_R(\lambda)$, $Q_G(\lambda)$, $Q_B(\lambda)$ may be obtained e.g. by using a second measuring apparatus in a measuring laboratory. The second measuring apparatus may be separate or remote from the assembly line, which is used for assembling the spectral imaging device. The quantum efficiency data $Q_R(\lambda)$, $Q_G(\lambda)$, $Q_B(\lambda)$ may be obtained e.g. by scanning the wavelength $\lambda$ of monochromatic calibration light over a spectral range RNG2. The range RNG2 may be divided into scanning steps, wherein the number of the scanning steps covering the whole range RNG2 may be e.g. in the range of 100 to 100000. The quantum efficiency $Q_R(\lambda)$, $Q_G(\lambda)$, $Q_B(\lambda)$ may be measured at each wavelength $\lambda$ determined by a scanning step of the range RNG2.

$T_{FIL}(\lambda)$ denotes the combined spectral transmittance of other optical components of the spectral imaging device, except the Fabry-Perot interferometer. In particular, the spectral transmittance function $T_{FIL}(\lambda)$ represents the one or more pass band limiting filters of the spectral imaging device.

$I_{MPBF}(\lambda)$ denotes the (previously measured) spectral intensity distribution of the calibration light formed by the multi pass band filter. The intensity of the first calibration light may be known as the function of wavelength $\lambda$ at least within a whole measurement range RNG2 from $\lambda_{MIN}$ to $\lambda_{MAX}$. The range RNG2 may be divided into scanning steps, wherein the number of the scanning steps covering the whole range RNG2 may be e.g. in the range of 100 to 100000. The spectrum $I_{MPBF}(\lambda)$ may be known at each wavelength $\lambda$ determined by a scanning step of said range RNG2.

The actual quantum efficiencies $Q_R(\lambda)$, $Q_G(\lambda)$, $Q_B(\lambda)$ and the actual spectral transmittance function $T_{FP,PRE}(\lambda,V_d)$ of the spectral imaging device are likely to be slightly erroneous. The initial transmittance function $T_{FP,PRE}$ may be replaced with a modified transmittance function $T_{FP,MOD,k}$, in order to iteratively minimize the error.

The modified transmittance function $T_{FP,MOD,k}$ may be formed e.g. by using auxiliary functions $f_k(\lambda)$, $g_k(\lambda)$, $h_k(V_d)$. The multiplying function $f_k(\lambda)$ may modify the spectral magnitude of the transmittance function $T_{FP,MOD,k}$. The spectral correcting function $g_k(\lambda)$ may provide a modified wavelength $\lambda_{MOD,k}$. The control correcting function $h_k(V_d)$ may provide a modified control signal value $V_{d,MOD,k}$.

$$\lambda_{MOD,k} = g_k(\lambda) \qquad (3a)$$

$$V_{d,MOD,k} = h_k(V_d) \qquad (3b)$$

$$T_{FP,MOD,k} = f_k \cdot T_{FP,PRE}(\lambda_{MOD,k}, V_{MOD,k}) \qquad (3c)$$

$$T_{FP,MOD,k} = f_k \cdot T_{FP,PRE}(g_k(\lambda), h_k(V_d)) \qquad (3d)$$

The multiplying function $f_k(\lambda)$ may be e.g. a polynomial function, a piecewise defined polynomial function (e.g. a polynomial spline), a power function, or a sum of power functions. A power function is the product of a coefficient, and a variable raised to a fixed real number. The spectral correcting function $g_k(\lambda)$ may be e.g. a polynomial function, a piecewise defined polynomial function, a power function, or a sum of power functions. The control correcting function $h_k(V_d)$ may be e.g. a polynomial function, a piecewise defined polynomial function, a power function, or a sum of power functions.

The functions $f_k(\lambda)$, $g_k(\lambda)$, $h_k(V_d)$ may be implemented e.g. as polynomials parametrized by the polynomial coefficients, optionally including fractional powers and/or as look-up tables with points at selected locations in the domain of the functions, optionally followed by interpolation to the intermediate values. The functions $f_k(\lambda)$, $g_k(\lambda)$, $h_k(V_d)$ may be specified by calibration data. The calibration data may be iteratively modified until the simulated profiles match the measured profiles. The parameters in the definitions of the functions (coefficients, look-up table values, etc.) may found as the result of an iterative optimization procedure.

The iterative optimization may be started (k=0) by using the following functions:

$$f_{k=0}(\lambda) = 1 \tag{3e}$$

$$g_{k=0}(\lambda) = \lambda \tag{3f}$$

$$h_{k=0}(V_d) = V_d \tag{3g}$$

$$T_{FP,MOD,k=0} = T_{FP,PRE}(\lambda, V_d) \tag{3h}$$

The functions $f_k(\lambda)$, $g_k(\lambda)$, and/or $h_k(V_d)$ may be iteratively modified until an error indicator value fulfils a predetermined criterion.

The simulated spectral profiles for the different color channels of the spectral imaging device after the k-th iteration (k=1,2,3, 4, . . . ) is $$S_{R,SIM,k}(V_d) = \int_{\lambda_{MIN}}^{\lambda_{MAX}} Q_R(\lambda) T_{FP,MOD,k}(\lambda, V_d) T_{FIL}(\lambda) I_{MPBF}(\lambda) d\lambda \tag{4a}$$

$$S_{G,SIM,k}(V_d) = \int_{\lambda_{MIN}}^{\lambda_{MAX}} Q_G(\lambda) T_{FP,MOD,k}(\lambda, V_d) T_{FIL}(\lambda) I_{MPBF}(\lambda) d\lambda \tag{4b}$$

$$S_{B,SIM,k}(V_d) = \int_{\lambda_{MIN}}^{\lambda_{MAX}} Q_B(\lambda) T_{FP,MOD,k}(\lambda, V_d) T_{FIL}(\lambda) I_{MPBF}(\lambda) d\lambda \tag{4c}$$

For example, an error indicator value $ErrS_k$ may represent an average deviation or an average squared deviation between measured and simulated signal amplitudes:

$$ErrS_k = \sum_c \int_{V_{d,MIN}}^{V_{d,MAX}} (S_{c,MEAS}(V_d) - S_{c,SIM,k}(V_d))^2 dV_d \tag{5a}$$

The error indicator value $ErrS_k$ may take into account the contribution of all color channels (c) and all peaks of the measured profile within the range from $V_{d,MIN}$ to $V_{d,MAX}$.

For example, an error indicator value $ErrP_k$ may represent an average deviation or an average squared deviation between measured and simulated positions of spectral peaks of calibration light formed by the multi pass band filter:

$$ErrP_k = \sum_c \sum_p (\lambda_{c,p,PEAK,MEAS} - \lambda_{c,p,PEAK,SIM})^2 \tag{5b}$$

The error indicator value $ErrP_k$ may take into account the contribution of all color channels and all peaks of the measured profile within the range from $V_{d,MIN}$ to $V_{d,MAX}$.

The error indicator value $ErrS_k$, $ErrP_k$ may also be called e.g. as an error metric or as an error merit value.

$\lambda_{c,p,PEAK,MEAS}$ denotes the wavelength of a peak of a measured profile, wherein the peak is associated with an index p, and wherein the measured profile is associated with a color c.

$\lambda_{c,p,PEAK,SIM}$ denotes the wavelength of a peak of a simulated profile, wherein the peak is associated with an index p, and wherein the measured profile is associated with a color c.

Each peak of a first measured profile $S_{R,MEAS}(V_d)$ within the range from $V_{d,MIN}$ to $V_{d,MAX}$ is associated with a different index p=1,2,3,4, . . . ,PMAX.

PMAX denotes the number of peaks within the range from $V_{d,MIN}$ to $V_{d,MAX}$.

Each peak of a second measured profile $S_{G,MEAS}(V_d)$ within the range from $V_{d,MIN}$ to $V_{d,MAX}$ is associated with a different index p=1,2,3,4, . . . ,PMAX.

Each peak of a third measured profile $S_{B,MEAS}(V_d)$ within the range from $V_{d,MIN}$ to $V_{d,MAX}$ is associated with a different index p=1,2,3,4, . . . ,PMAX.

The relative weights of different colors and/or different peaks may be equal, as shown in equations (5a) and (5b). However, the relative weights of different colors and/or different peaks may also be different when calculating the error indicator value $ErrS_k$ and/or $ErrP_k$.

An error indicator value may also be formed as a linear combination of the error indicator values $ErrS_k$ and $ErrP_k$.

The formulations of the error metric ($ErrS_k$, $ErrP_k$) together with an optimization algorithm may be used to find parameters for the functions $f_k(\lambda)$, $g_k(\lambda)$, and/or $h_k(V_d)$ that minimize the error metric. A global optimization method that accepts both continuous (for $f_k(\lambda)$, $g_k(\lambda)$) and discrete (for $h_k(V_d)$) may be used, but global optimization is not necessary.

An example of such an algorithm is the family of "genetic algorithms" for global optimization.

The definition of the inputs for the optimizer algorithm may be e.g. as follows:

State variables are the parameters that define the functions $f_k(\lambda)$, $g_k(\lambda)$, and $h_k(V_d)$.

The initial conditions are described e.g. in equations (3e), (3f), 3g).

The function to minimize is a subroutine that computes the value of either the value of $ErrS_k$ or $ErrP_k$, when the state variables are given. The subroutine may be configured to compute the value of $ErrS_k$ or $ErrP_k$ when the state variables are given. The subroutine may take as an additional input the data sets ($S_{R,MEAS}(V_d)$, $S_{G,MEAS}(V_d)$, $S_{B,MEAS}(V_d)$, $Q_R(\lambda)$, $Q_G(\lambda)$, $Q_B(\lambda)$, $T_{FP,PRE}(\lambda, V_d)$, $I_{MPBF}(\lambda)$), which are used for the computation of the simulated profiles $S_{R,SIM,k}(V_d)$, $S_{G,SIM,k}(V_d)$, $S_{B,SIM,k}(V_d)$, and then for computation of the error metric $ErrS_k$ and/or $ErrP_k$.

The information about the expected variability of the different parameters can be introduced as non-linear constraint inequalities. The algorithm may be provided e.g. with subroutines that compute the left-hand sides of the following inequalities:

$$|f_k(\lambda) - 1| - \varepsilon_1(\lambda) < 0 \tag{5c}$$

$$|g_k(\lambda) - \lambda| - \varepsilon_2(\lambda) < 0 \tag{5d}$$

$$|h_k(V_d) - V_d| - \varepsilon_3(V_d) < 0 \tag{5e}$$

The functions $\varepsilon_1(\lambda)$, $\varepsilon_2(\lambda)$, and $\varepsilon_3(V_d)$ express the information about the variation in the manufacturing batch between the spectral transmittance of individual Fabry-Perot interferometers and the previously measured reference data $T_{FP,PRE}(\lambda, V_d)$.

The state variables can be prescribed upper and lower bounds that restrict the domain of values that the optimization algorithm searches, based on knowledge from the variation in the corresponding spectra. Often these bounds are selected to be less restrictive than the equation (5c), (5d), (5e), but they may help the optimization algorithm in searching for values of the state variables that satisfy (5c), (5d), (5e).

The iterative optimization procedure may yield functions $f_k(\lambda)$, $g_k(\lambda)$, $h_k(V_d)$, $T_{FP.MOD,k}$, which may in turn provide the best fit, i.e., smallest error indicator value. The functions $f_k(\lambda)$, $g_k(\lambda)$, $h_k(V_d)$, $T_{FP.MOD,k}$ may be re-named as $f_{FIT}(\lambda)$, $g_{FIT}(\lambda)$, $h_{FIT}(V_d)$, $T_{FP.FIT}(\lambda)$. The most accurate estimate for the spectral transmittance function of the Fabry-Perot interferometer is $$T_{FP,FIT}(\lambda, V_d) = f_{FIT} \cdot T_{FP,PRE}(g_{FIT}(\lambda), h_{FIT}(V_d)) \tag{6a}$$

Each local maximum of the function $T_{FP,FIT}(\lambda, V_d)$ associates a control signal value $V_d$ with a corresponding wavelength $\lambda$ of a transmittance peak of the Fabry-Perot interferometer. The best fit spectral transmittance function $T_{FP,FIT}(\lambda, V_d)$ allows determining a quite accurate relation between the control signal $V_d$ and corresponding wavelengths $\lambda_0$, $\lambda_1$, $\lambda_2$, ... of spectral transmittance peaks of the Fabry-Perot interferometer. One or more spectral calibration functions $\lambda_0(V_d)$, $\lambda_1(V_d)$, $\lambda_2(V_d)$, ... may be determined from the spectral transmittance function $T_{FP,FIT}(\lambda, V_d)$. The spectral calibration functions $\lambda_0(V_d)$, $\lambda_1(V_d)$, $\lambda_2(V_d)$, ... establish a relation between the control signal $V_d$ and corresponding wavelengths $\lambda_0$, $\lambda_1$, $\lambda_2$, ... of spectral transmittance peaks of the Fabry-Perot interferometer.

The spectral position $\lambda_0$ of a first transmittance peak of the transmittance function $T_{FP,FIT}(\lambda, V_d)$ may be determined from the control signal value $V_d$ by a first spectral calibration function $$\lambda_0 = \lambda_0(V_d) \tag{6b}$$

The control signal value $V_d$ corresponding to the spectral position $\lambda_0$ of the first transmittance peak of the transmittance function $T_{FP,FIT}(\lambda, V_d)$ may be determined from the inverse spectral calibration function $$V_d = V_d(\lambda_0) \tag{6c}$$

where $$\lambda_0 = \lambda_0(V_d(\lambda_0)) \tag{6c}$$

The detector signals of the different color channels may be estimated with a high accuracy as follows $$S_{R,FIT}(V_d) = \int_{\lambda_{MIN}}^{\lambda_{MAX}} Q_R(\lambda) T_{FP,FIT}(\lambda, V_d) T_{FIL}(\lambda) I_{MPBF}(\lambda) d\lambda \tag{7a}$$

$$S_{G,FIT}(V_d) = \int_{\lambda_{MIN}}^{\lambda_{MAX}} Q_G(\lambda) T_{FP,FIT}(\lambda, V_d) T_{FIL}(\lambda) I_{MPBF}(\lambda) d\lambda \tag{7b}$$

$$S_{B,FIT}(V_d) = \int_{\lambda_{MIN}}^{\lambda_{MAX}} Q_B(\lambda) T_{FP,FIT}(\lambda, V_d) T_{FIL}(\lambda) I_{MPBF}(\lambda) d\lambda \tag{7c}$$

$S_{R,FIT}(V_d)$, $S_{G,FIT}(V_d)$, $S_{B,FIT}(V_d)$ denote simulated detector signals, which best fit the measured spectral profiles $S_{R,MEAS}(V_d)$, $S_{G,MEAS}(V_d)$, $S_{B,MEAS}(V_d)$.

The spectral imaging device may be sufficiently calibrated by using the first calibration light, which has stable known spectrum $I_{MPBF}(\lambda)$ with a plurality of spectral peaks.

The calibration method may optionally comprise using second broadband calibration light, in addition to using the first calibration light. Spectral intensity information can be obtained from the second calibration light separately. The second calibration light may be obtained from a broad band light source without using a multi pass band filter. The first calibration light may be used for calibrating the spectral scale, and the second calibration light may be used for calibrating the spectral intensity values. The first calibration light may be used for minimizing the error indicator value $ErrP_k$. The second calibration light may be used for minimizing the error indicator value $ErrS_k$. When using the second broadband calibration light, it is not necessary to accurately know the spectral intensity values of the first calibration light, as long as the spectral positions of the spectral peaks of the first calibration light are known.

Thus, the method may optionally comprise coupling second calibration light to the spectral imaging device. The second calibration light may have a broadband spectrum $I_{CAL2}(\lambda)$. When using the second calibration light, a second set of simulated signals $S_{R,SIM,k}$, $S_{R,SIM,k}$, $S_{R,SIM,k}$ may be formed as follows:

$$S_{R,SIM,k}(V_d) = \int_{\lambda_{MIN}}^{\lambda_{MAX}} Q_R(\lambda) T_{FP,MOD,k}(\lambda, V_d) T_{FIL}(\lambda) I_{CAL2}(\lambda) d\lambda \tag{7d}$$

$$S_{G,SIM,k}(V_d) = \int_{\lambda_{MIN}}^{\lambda_{MAX}} Q_G(\lambda) T_{FP,MOD,k}(\lambda, V_d) T_{FIL}(\lambda) I_{CAL2}(\lambda) d\lambda \tag{7e}$$

$$S_{B,SIM,k}(V_d) = \int_{\lambda_{MIN}}^{\lambda_{MAX}} Q_B(\lambda) T_{FP,MOD,k}(\lambda, V_d) T_{FIL}(\lambda) I_{CAL2}(\lambda) d\lambda \tag{7f}$$

A second set of detector signals $S_{R,MEAS}$, $S_{G,MEAS}$, $S_{B,MEAS}$, of the different color channels may be measured when the second calibration light is coupled to the spectral imaging device, and the simulated signals $S_{R,SIM,k}$, $S_{R,SIM,k}$, $S_{R,SIM,k}$ calculated from the known broadband spectrum $I_{CAL2}(\lambda)$ may be iteratively modified until the error indicator value $ErrS_k$ fulfils a predetermined criterion. Using the second calibration light, in addition to using the first calibration light, may facilitate determining the magnitude correcting function $f_{FIT}(\lambda)$.

After the spectral imaging device has been produced and calibrated, the spectral imaging device may be subsequently used for measuring an unknown spectrum $X(\lambda)$ of input light. When measuring an unknown input spectrum $X(\lambda)$, the formation of the detector signals of the different color channels R, G, B may be approximated as follows:

$$S_R(V_d) = \int_{\lambda_{MIN}}^{\lambda_{MAX}} Q_R(\lambda) T_{FP,FIT}(\lambda, V_d) T_{FIL}(\lambda) X(\lambda) d\lambda \tag{8a}$$

$$S_G(V_d) = \int_{\lambda_{MIN}}^{\lambda_{MAX}} Q_G(\lambda) T_{FP,FIT}(\lambda, V_d) T_{FIL}(\lambda) X(\lambda) d\lambda \tag{8b}$$

$$S_B(V_d) = \int_{\lambda_{MIN}}^{\lambda_{MAX}} Q_B(\lambda) T_{FP,FIT}(\lambda, V_d) T_{FIL}(\lambda) X(\lambda) d\lambda \tag{8c}$$

The spectral range from $\lambda_{MIN}$ to $\lambda_{MAX}$ may include several transmittance peaks of the Fabry-Perot interferometer. Each transmittance peak may transmit a spectral component of the unknown spectrum $X(\lambda)$ at the wavelength of said transmittance peak. Consequently, the detector signal of a color channel may be formed as a linear combination of contributions of spectral components at several discrete wavelengths.

When the number of transmittance peaks is less than or equal to the number of color channels, it may then be possible to calculate the values of the input spectrum at wavelengths corresponding to each one of the transmittance peaks.

The relative contribution of an input spectrum to the detector signal of a given color channel at discrete wavelengths $\lambda_0$, $\lambda_1$, $\lambda_2$ may be approximated by using matrix elements U. The discrete wavelengths $\lambda_0$, $\lambda_1$, $\lambda_2$ are the spectral positions of the transmittance peaks of the Fabry-Perot interferometer at a given control signal value $V_d$. The matrix elements U may be defined e.g. as follows $$U_{R,n}(V_d) = \int_{\lambda 0(V_d) - \frac{RNG1}{2}}^{\lambda 0(V_d) + \frac{RNG1}{2}} Q_R(\lambda) T_{FP,FIT}(\lambda, V_d) T_{FIL}(\lambda) d\lambda \tag{9A}$$

$$U_{G,n}(V_d) = \int_{\lambda 0(V_d) - \frac{RNG1}{2}}^{\lambda 0(V_d) + \frac{RNG1}{2}} Q_G(\lambda) T_{FP,FIT}(\lambda, V_d) T_{FIL}(\lambda) d\lambda \tag{9b}$$

$$U_{B,n}(V_d) = \int_{\lambda 0(V_d) - \frac{RNG1}{2}}^{\lambda 0(V_d) + \frac{RNG1}{2}} Q_B(\lambda) T_{FP,FIT}(\lambda, V_d) T_{FIL}(\lambda) d\lambda \tag{9c}$$

$$U_{R,n+1}(V_d) = \int_{\lambda 1(V_d) - \frac{RNG1}{2}}^{\lambda 1(V_d) + \frac{RNG1}{2}} Q_R(\lambda) T_{FP,FIT}(\lambda, V_d) T_{FIL}(\lambda) d\lambda \tag{9d}$$

$$U_{G,n+1}(V_d) = \int_{\lambda 1(V_d) - \frac{RNG1}{2}}^{\lambda 1(V_d) + \frac{RNG1}{2}} Q_G(\lambda) T_{FP,FIT}(\lambda, V_d) T_{FIL}(\lambda) d\lambda \tag{9e}$$

$$U_{B,n+1}(V_d) = \int_{\lambda 1(V_d) - \frac{RNG1}{2}}^{\lambda 1(V_d) + \frac{RNG1}{2}} Q_B(\lambda) T_{FP,FIT}(\lambda, V_d) T_{FIL}(\lambda) d\lambda \tag{9f}$$

$$U_{R,n+2}(V_d) = \int_{\lambda 2(V_d) - \frac{RNG1}{2}}^{\lambda 2(V_d) + \frac{RNG1}{2}} Q_R(\lambda) T_{FP,FIT}(\lambda, V_d) T_{FIL}(\lambda) d\lambda \tag{9g}$$

$$U_{G,n+2}(V_d) = \int_{\lambda 2(V_d) - \frac{RNG1}{2}}^{\lambda 2(V_d) + \frac{RNG1}{2}} Q_G(\lambda) T_{FP,FIT}(\lambda, V_d) T_{FIL}(\lambda) d\lambda \tag{9h}$$

$$U_{B,n+2}(V_d) = \int_{\lambda 2(V_d) - \frac{RNG1}{2}}^{\lambda 2(V_d) + \frac{RNG1}{2}} Q_B(\lambda) T_{FP,FIT}(\lambda, V_d) T_{FIL}(\lambda) d\lambda \tag{9i}$$

The width of the integration spectral range RNG1 may be selected e.g. such that the range RNG1 includes at least 95% of the spectral transmittance peak in question, but does not include more than 5% of the area of any other spectral transmittance peak. The width of the spectral range RNG1 may be in the range of 20% to 50% of the free spectral range of the Fabry-Perot interferometer.

The detector signals $S_R$, $S_G$, $S_B$ may be formed as linear combinations of the intensity values $X_n$, $X_{n+1}$, $X_{n+2}$, where the intensity value $X_n$ is the intensity at the wavelength $\lambda_0$ of a first transmittance peak, the intensity value $X_{n+1}$ is the intensity at the wavelength $\lambda_1$ of a second transmittance peak, and the intensity value $X_{n+2}$ is the intensity at the wavelength $\lambda_2$ of a third transmittance peak. The wavelengths $\lambda_0$, $\lambda_1$, $\lambda_2$, are functions of the control signal value $V_d$.

Forming of the detector signals $S_R$, $S_G$, $S_B$ may be described by the following matrix equation $$\begin{bmatrix} S_R \\ S_G \\ S_B \end{bmatrix} = \begin{bmatrix} U_{R,n+2} & U_{R,n+1} & U_{R,n} \\ U_{G,n+2} & U_{G,n+1} & U_{G,n} \\ U_{B,n+2} & U_{B,n+1} & U_{B,n} \end{bmatrix} \begin{bmatrix} X_{n+2} \\ X_{n+1} \\ X_n \end{bmatrix} \tag{10a}$$

Where $X_n = X(\lambda_0(V_d))$, $X_{n+1} = X(\lambda_1(V_d))$, $X_{n+2} = X(\lambda_2(V_d))$, $S_R = S_{R,MEAS}(V_d)$, $S_G = S_{G,MEAS}(V_d)$, and $S_B = S_{B,MEAS}(V_d)$.

The matrix M may consist of a first set of elements U $$M = \begin{bmatrix} U_{R,n+2} & U_{R,n+1} & U_{R,n} \\ U_{G,n+2} & U_{G,n+1} & U_{G,n} \\ U_{B,n+2} & U_{B,n+1} & U_{B,n} \end{bmatrix} \tag{10b}$$

Consequently $$\begin{bmatrix} S_R \\ S_G \\ S_B \end{bmatrix} = M \begin{bmatrix} X_{n+2} \\ X_{n+1} \\ X_n \end{bmatrix} \tag{10c}$$

The intensity values $X_n$, $X_{n+1}$, $X_{n+2}$ may be solved from the detector signals $S_R$, $S_G$, $S_B$ by using a pseudo-inverse matrix $M^\dagger$ of the matrix M $$\begin{bmatrix} X_{n+2} \\ X_{n+1} \\ X_n \end{bmatrix} = M^\dagger \begin{bmatrix} S_R \\ S_G \\ S_B \end{bmatrix} \tag{10d}$$

The pseudo-inverse matrix $M^\dagger$ is computed as $$M^\dagger = \left( M^T M + \mu \| M^T M \| I \right)^{-1} M^T \tag{10e}$$

where $M^T$ is the transpose of the matrix, $\|\cdot\|$ is the matrix norm, I is the identity matrix, and $(\cdot)^{-1}$ is the inverse matrix. $\mu$ is a scalar constant, with typical value $\mu = 10^{-3}$. It is used to control the magnitude of the result, and thereby eventually pixel noise in the final processed images, especially in the cases when the rows of the matrix M are linearly dependent, or numerically close to being linearly dependent, i.e., the matrix M is either not invertible or numerically close to being not invertible. If the matrix M is invertible and $\mu = 0$, then $M^\dagger = M^{-1}$, i.e., the method of the old patent is included as a special case.

The pseudo-inverse matrix $M^\dagger$ may consist of a second set of matrix elements K $$\begin{bmatrix} K_{Rn+2} & K_{Gn+2} & K_{Bn+2} \\ K_{Rn+1} & K_{Gn+1} & K_{Bn+1} \\ K_{Rn} & K_{Gn} & K_{Bn} \end{bmatrix} = M^\dagger \tag{10f}$$

The matrix M and/or the pseudo-inverse matrix $M^\dagger$ provide a link between the accurate calibration spectrum the $I_{MPBF}(\lambda)$ and the measured detector signal values.

The matrix M enables mapping from the accurate values $I_{MPBF}(\lambda_0(V_d))$, $I_{MPBF}(\lambda_1(V_d))$, $I_{MPBF}(\lambda_2(V_d))$ of the calibration spectrum $I_{MPBF}(\lambda)$ to the measured values $S_{R,MEAS}(V_d)$, $S_{G,MEAS}(V_d)$, $S_{B,MEAS}(V_d)$ of the spectral profiles.

The pseudo-inverse matrix $M^\dagger$ enables mapping from the measured values $S_{R,MEAS}(V_d)$, $S_{G,MEAS}(V_d)$, $S_{B,MEAS}(V_d)$ of the spectral profiles to the accurate values $I_{MPBF}(\lambda_0(V_d))$, $I_{MPBF}(\lambda_1(V_d))$, $I_{MPBF}(\lambda_2(V_d))$ of the calibration spectrum $I_{MPBF}(\lambda)$.

At a later stage, when using the spectral imaging device for measuring an unknown spectrum $X(\lambda)$, the pseudo-inverse matrix $M^{\dagger}$ enables mapping from the measured values $S_{R,MEAS}(V_d)$, $S_{G,MEAS}(V_d)$, $S_{B,MEAS}(V_d)$ of the spectral profiles to the accurate values $X(\lambda_0(V_d))$, $X(\lambda_1(V_d))$, $X(\lambda_2(V_d))$ of the unknown spectrum $X(\lambda)$.

The number of the different color channels may be e.g. in the range of 2 to 5. The number of the spectral transmittance peaks within the pass band of the spectral imaging device may be e.g. in the range of 1 to 5. The number of the spectral transmittance peaks is smaller than or equal to the number of the different color channels. When the number of transmittance peaks is less than or equal to the number of colour channels in the spectral imaging device it is possible to recover the values of the input spectrum at wavelengths corresponding to each one of the transmittance peaks.

The number of spectral transmittance peaks within the spectral measurement range (RNG2) may be smaller than or equal to the number of the color channels (c).

For example, the number of different color channels may be 2, and the number of transmittance peaks may be 1.

For example, the number of different color channels may be 3, and the number of transmittance peaks may be 1.

For example, the number of different color channels may be 4, and the number of transmittance peaks may be 1.

For example, the number of different color channels may be 2, and the number of transmittance peaks may be 2.

For example, the number of different color channels may be 3, and the number of transmittance peaks may be 2.

For example, the number of different color channels may be 4, and the number of transmittance peaks may be 2. The color channels may be e.g. red (R), green (G), blue (B), and infrared (IR). In that case the matrix M may be $$M = \begin{bmatrix} U_{R,n+1} & U_{R,n} \\ U_{G,n+1} & U_{G,n} \\ U_{B,n+1} & U_{B,n} \\ U_{IR,n+1} & U_{IR,n} \end{bmatrix} \tag{11a}$$

The symbol n denotes an element associated with a transmittance peak at the wavelength $\lambda_0(V_d)$. The symbol n+1 denotes an element associated with a transmittance peak at the wavelength $\lambda_1(V_d)$.

The corresponding pseudo-inverse matrix $M^{\dagger}$ may be $$M^{\dagger} = \begin{bmatrix} K_{Rn+1} & K_{Gn+1} & K_{Bn+1} & K_{IRn+1} \\ K_{Rn} & K_{Gn} & K_{Bn} & K_{IRn} \end{bmatrix} \tag{11b}$$

For example, the number of different color channels may be 3, and the number of transmittance peaks may be 3.

For example, the number of different color channels may be 4, and the number of transmittance peaks may be 3.

For example, the number of different color channels may be 4, and the number of transmittance peaks may be 4.

The spectral properties of the individual components of the spectral imaging device may exhibit statistical random variations from the previously measured representative properties. The manufacturing tolerances may be at least partly compensated by using the functions $f_k(\lambda)$, $g_k(\lambda)$, $h_k(V_d)$. Within the range of variation of the manufacturing batch we have, intuitively, $$f_k(\lambda) \approx 1 \tag{12a}$$

$$g_k(\lambda) \approx \lambda \tag{12b}$$

$$h_k(V_d) \approx V_d \tag{12c}$$

In other words, the simulated signals may typically correspond to the measured signals when the multiplying function $f_k(\lambda)$ is approximately equal to one, but not exactly equal to one. In other words, the simulated signals may typically correspond to the measured signals when the spectral correcting function $g_k(\lambda)$ is approximately equal to $\lambda$, but not exactly equal to $\lambda$. In other words, the simulated signals may typically correspond to the measured signals when the control correcting function $h_k(V_d)$ is approximately equal to $V_d$, but not exactly equal to $V_d$. More rigorously the above is written as $$|f_k(\lambda) - 1| < \varepsilon_1(\lambda) \tag{12d}$$

$$|g_k(\lambda) - \lambda| < \varepsilon_2(\lambda) \tag{12e}$$

$$|h_k(V_d) - V_d| < \varepsilon_3(V_d) \tag{12f}$$

The functions $\varepsilon_1(\lambda)$, $\varepsilon_2(\lambda)$, and $\varepsilon_3(V_d)$ express the information about the variation in the manufacturing batch between the spectral transmitttance of individual Fabry-Perot interferometers and the previously measured reference data $T_{FP,PRE}(\lambda, V_d)$.

Optionally, if it is known that there is a significant variation in the spectral quantum efficiencies $Q_R(\lambda)$, $Q_G(\lambda)$, $Q_B(\lambda)$ of the detector pixels, then different multiplying functions $f_{R,k}(\lambda)$, $f_{G,k}(\lambda)$, $f_{B,k}(\lambda)$ may be used for each color channel, replacing the common multiplying function $f_k(\lambda)$. The multiplying functions $f_{R,k}(\lambda)$, $f_{G,k}(\lambda)$, $f_{B,k}(\lambda)$ may take into account possible variations in the transmittance value of the current Fabry-Perot interferometer unit and the spectral quantum efficiency of the colour channel c compared to the reference Fabry-Perot interferometer transmittance, at each wavelength. The individual variation of the properties of a Fabry-Perot interferometer unit and the individual variation of the properties of an image sensor may be combined into the same function since the contribution of the Fabry-Perot interferometer transmittance and quantum efficiencies are combined in the assembled spectral imaging device.

The method may comprise:
obtaining previously measured quantum efficiency functions $Q_R$, $Q_G$, OB,
obtaining a previously measured spectral transmittance function $T_{FP,PRE}(\lambda, V_d)$ of a Fabry-Perot interferometer,
assembling a spectral imaging device by combining a Fabry-Perot interferometer with an image sensor,
coupling first calibration light to the spectral imaging device, wherein the first calibration light comprises a plurality of spectral calibration peaks,
measuring a first set of spectral profiles by varying a control signal value $V_d$ and recording detector signals of several color channels as the function of the control signal $V_d$, in a situation where the spectral imaging device detects the first calibration light,
forming a second set of simulated spectral profiles from the previously measured quantum efficiency functions $Q_R$, $Q_G$, $Q_B$, from the previously measured spectral transmittance function $T_{FP,PRE}(\lambda, V_d)$, and from the spectral intensity distribution $I_{MPBF}(\lambda)$ of the first calibration light by using calibration functions $f(\lambda),g(\lambda),h(V_d)$, comparing the measured spectral profiles with the simulated spectral profiles, determining calibration parameters by iteratively optimizing the calibration functions $f(\lambda),g(\lambda),h(V_d)$, such that the simulated spectral profiles correspond to the measured spectral profiles, determining a first set of matrix elements (U) by using the determined calibration functions $f(\lambda),g(\lambda),h(V_d)$, wherein the first set of matrix elements (U) constitute a first matrix M, determining a second set of matrix elements (K) such that the second set of matrix elements (K) constitute a pseudo-inverse matrix $M^\dagger$ of the first matrix M, storing the second set of matrix elements (K) in a memory of the spectral imaging device.

The second set of matrix elements (K) may be subsequently used for determining intensity values X from measured detector signals.

Figure 8A:
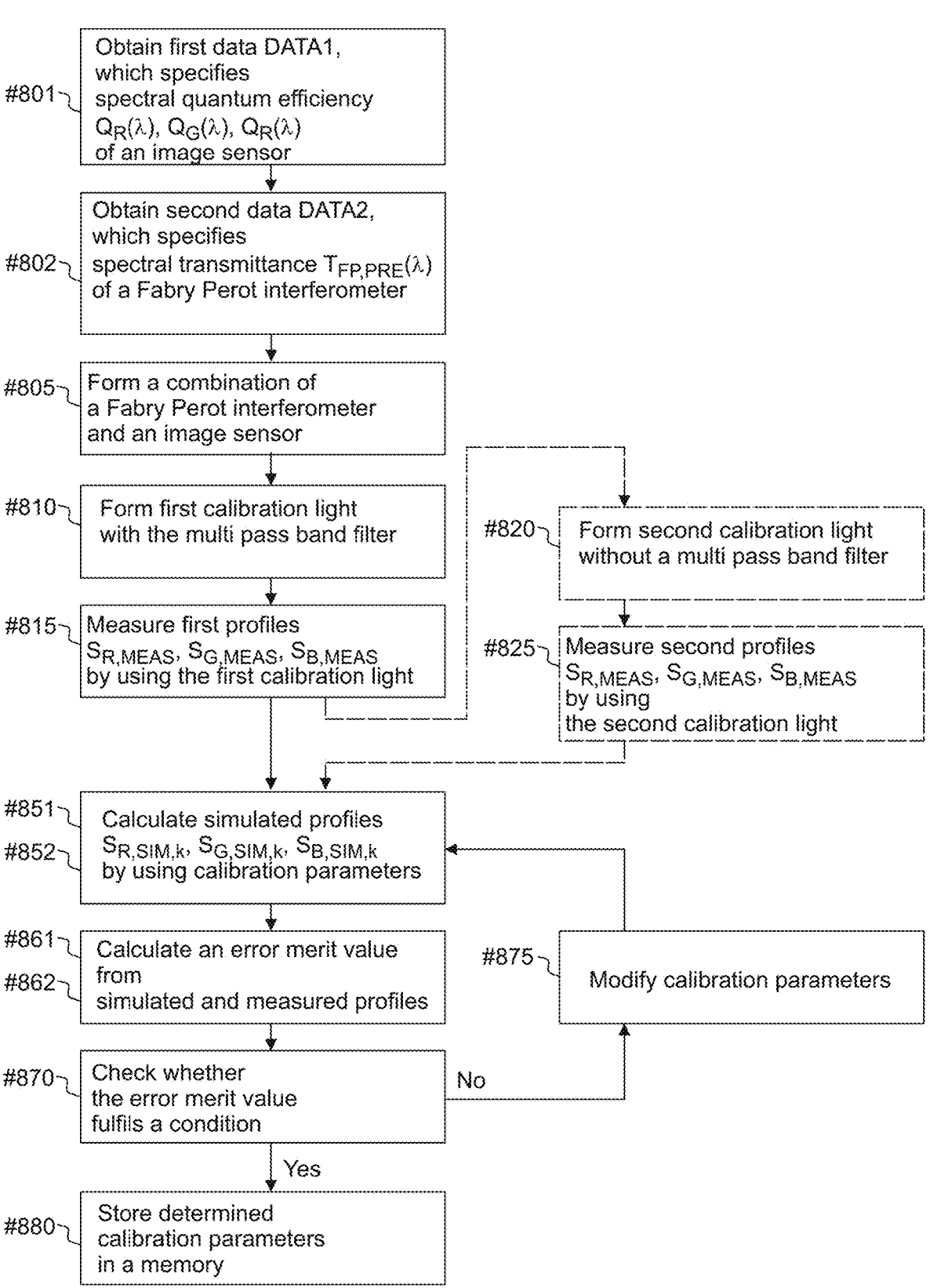
FIG. 8a shows, by way of example, method steps for producing and calibrating the spectral imaging device.

Referring to FIG. 8a, a method for producing and calibrating the spectral imaging device may comprise e.g. the following steps.

First spectral data DATA1 specifying previously measured spectral quantum efficiencies $Q_R(\lambda)$, $Q_G(\lambda)$, $Q_B(\lambda)$ of the detector pixels P0, P1, P2 may be obtained (step #801).

Second spectral data DATA2 specifying previously measured spectral transmittance $T_{FP,PRE}(\lambda,V_d)$ of the Fabry-Perot interferometer may be obtained (step #802).

A Fabry-Perot interferometer may be combined with an image sensor (step #805). A combination CMB1, which comprises a Fabry-Perot interferometer FPI1 and an image sensor SEN1 may be formed. In particular, a spectral imaging device 500 comprising the combination CMB1 may be assembled at an assembly line.

First calibration light may be formed by using the multipass band filter MPBF1 (step #810).

Measured profiles $S_{R,MEAS}(V_d)$, $S_{G,MEAS}(V_d)$, $S_{B,MEAS}(V_d)$, may be obtained by coupling the first calibration light to the spectrometer, and by measuring the detector signals when scanning the control parameter value $V_d$ over a scanning range RNG3 (step #815). The first calibration light LB1CAL may be coupled to the combination CMB1, and the profiles $S_{R,MEAS}(V_d)$, $S_{G,MEAS}(V_d)$, $S_{B,MEAS}(V_d)$ may be measured.

Simulated profiles $S_{R,SIM,k}(V_d)$, $S_{G,SIM,k}(V_d)$, $S_{B,SIM,k}(V_d)$ may be calculated from the known spectrum $I_{MPBF}(\lambda)$ of the first calibration light, by using the equations (2a)-(4c) (step #851). For example, calculating the first simulated profile $S_{R,SIM,k}(V_d)$ comprises using the simulated spectral response $Q_R(\lambda) \cdot T_{FP,PRE}(\lambda,V_d)$. For example, the simulated profile $S_{R,SIM,k}(V_d)$ may be calculated based on the quantum efficiencies $Q_R(\lambda)$, spectral transmittance $T_{FP,PRE}(\lambda,V_d)$, and spectrum $I_{MPBF}(\lambda)$ of the first calibration light LB1CAL1, by using the functions $f_k(\lambda)$, $g_k(\lambda)$, $h_k(V_d)$.

Only the control parameter $V_d$ may be be scanned at the assembly line. There is no need to vary the spectral positions of the spectral peaks of the first calibration light at the assembly line, because this time-consuming operation (=scanning of the wavelength $\lambda$) may be omitted by using the simulated response of the assembled spectral imaging device.

One or more error indicator values ($ErrS_k$, $ErrP_k$) may be calculated e.g. by using the equation (5a) and/or (5b) (step 861).

The method may optionally comprise coupling second broadband calibration light into the spectral imaging device (step #820). The second calibration light LB1CAL2 may be formed without using a multi pass band filter MPBF1. The method may comprise obtaining a second set of measured profiles $S_{R,MEAS}(V_d)$, $S_{G,MEAS}(V_d)$, $S_{B,MEAS}(V_d)$ by coupling the second calibration light to the spectrometer, and by measuring the detector signals when scanning the control parameter value $V_d$ over a scanning range RNG3 (step #825). A second set of simulated profiles $S_{R,SIM,k}(V_d)$, $S_{G,SIM,k}(V_d)$, $S_{B,SIM,k}(V_d)$ may be calculated from the known spectrum $I_{CAL2}(\lambda)$ of the second calibration light (step #852). The second set of simulated profiles $S_{R,SIM,k}(V_d)$, $S_{G,SIM,k}(V_d)$, $S_{B,SIM,k}(V_d)$ may be calculated based on the quantum efficiencies $Q_R(\lambda)$, spectral transmittance $T_{FP,PRE}(\lambda,V_d)$, and spectrum $I_{CAL2}(\lambda)$ of the second calibration light LB1CAL2, by using the functions $f_k(\lambda)$. $g_k(\lambda)$, $h_k(V_d)$.

An error indicator value ($ErrS_k$) may be calculated for the second calibration light e.g. by using the equation (5a) (step #862). The error indicator value ($ErrS_k$) may be indicative of a degree of similarity between the measured profiles $S_{R,MEAS}(V_d)$, $S_{G,MEAS}(V_d)$, $S_{B,MEAS}(V_d)$ and the simulated profiles $S_{R,SIM,k}(V_d)$, $S_{G,SIM,k}(V_d)$, $S_{B,SIM,k}(V_d)$. The error indicator value ($ErrS_k$) may be indicative of a difference between the measured profiles $S_{R,MEAS}(V_d)$, $S_{G,MEAS}(V_d)$, $S_{B,MEAS}(V_d)$ and the simulated profiles $S_{R,SIM,k}(V_d)$, $S_{G,SIM,k}(V_d)$, $S_{B,SIM,k}(V_d)$.

The method may comprise checking whether the one or more error indicator values ($ErrS_k$, $ErrP_k$) fulfil one or more criterions (step #870).

The spectral transmittance function $T_{FP,MOD,k}(\lambda,V_d)$ may be iteratively modified until the one or more error indicator values ($ErrS_k$, $ErrP_k$) fulfil one or more criterions (step #875).

The functions $f_k(\lambda)$, $g_k(\lambda)$, and/or $h_k(V_d)$ may be iteratively modified until the one or more error indicator values ($ErrS_k$, $ErrP_k$) fulfil one or more criterions. The functions $f_k(\lambda)$, $g_k(\lambda)$, and/or $h_k(V_d)$ may be iteratively modified until the error indicator value $ErrS_k$ is smaller than a first predetermined limit value LIM1. The functions $f_k(\lambda)$, $g_k(\lambda)$, $h_k(V_d)$ may be iteratively modified until the error indicator value $ErrP_k$ is smaller than a second predetermined limit value LIM2. The functions $f_k(\lambda)$, $g_k(\lambda)$, $h_k(V_d)$ may be iteratively modified until the error indicator value $ErrS_k$ is smaller than a first predetermined limit value LIM1, and the error indicator value $ErrP_k$ is smaller than a second predetermined limit value LIM2.

The functions $f_k(\lambda)$, $g_k(\lambda)$, $h_k(V_d)$ may be iteratively modified until the error indicator value $ErrS_k$ and/or $ErrP_k$ is within a predetermined tolerance margin.

The method may comprise comparing measured profiles MSPEC2 with simulated profiles SIMSPEC2, and modifying calibration data based on the result of the comparison.

The final version $T_{FP,FIT}(\lambda,V_d)$ of the modified spectral transmittance function $T_{FP,MOD,k}(\lambda,V_d)$ may be stored in a memory (step #880). Calibration data specifying the function $T_{FP,FIT}(\lambda,V_d)$ may be stored in a memory. Calibration data specifying the functions $f_k(\lambda)$, $g_k(\lambda)$, $h_k(V_d)$ may be stored in a memory.

Referring to FIG. 8b, the elements $(U_{Rn}, \ldots U_{Bn+2})$ of the matrix M may be calculated by using the equations (9a)-(9i) (step #910).

The elements $(K_{Rn}, \ldots K_{Bn+2})$ of the pseudo-inverse matrix $M^\dagger$ may be calculated from the elements $(U_{R,n}, \ldots U_{Bn+2})$ of the matrix M e.g. by using the equation (10e) (step #920).

The elements ($K_{Rn}$, . . . . $K_{Bn+2}$) of the pseudo-inverse matrix $M^\dagger$ may be stored in a memory of the spectral imaging device (step #930). In particular, the elements ($K_{Rn}$, . . . . $K_{Bn+2}$) of the pseudo-inverse matrix $M^\dagger$ may be stored in a memory (MEM2) of the spectral imaging device 500.

FIG. 8c shows method steps for measuring an unknown spectrum $X(\lambda)$ of input light LB1. When measuring the unknown spectrum $X(\lambda)$, the input light LB1 may be coupled to the spectral imaging device, and a set of detector signals $S_{R,MEAS}(V_d)$, $S_{G,MEAS}(V_d)$, $S_{B,MEAS}(V_d)$ may be obtained from the image sensor SEN1 at a selected control signal value $V_d$ (step #1110).

The matrix elements ($K_{Rn}$, . . . . $K_{Bn+2}$) of the pseudo-inverse matrix $M^\dagger$ may be used for calculating one or more spectral intensity values ($X_n(\lambda_0(V_d))$, ($X_{n+1}(\lambda_1(V_d))$), ($X_{n+2}(\lambda_2(V_d))$) from measured spectral signals $S_{R,MEAS}(V_d)$, $S_{G,MEAS}(V_d)$, $S_{B,MEAS}(V_d)$ (step #1120).

The one or more spectral intensity values ($X_n(\lambda_0(V_d))$), ($X_{n+1}(\lambda_1(V_d))$), ($X_{n+2}(\lambda_2(V_d))$) may be outputted and/or stored in a memory (step #1130).

The wavelength Xo which corresponds to the control signal value $V_d$ may be determined e.g. by using the spectral calibration function $\lambda_0(V_d)$, see the equation (6b).

The control signal value $V_d$ which corresponds to the wavelength Xo may be determined e.g. by using the inverse spectral calibration function $V_d(Xo)$, see the equation (6c).

In an embodiment, a set of profiles $S_{R,MEAS}(V_d)$, $S_{G,MEAS}(V_d)$, $S_{B,MEAS}(V_d)$ may be measured by scanning the control signal $V_d$. The matrix elements ($K_{Rn}$, . . . . $K_{Bn+2}$) of the pseudo-inverse matrix $M^\dagger$ may be used for calculating one or more spectral intensity values ($X_n(\lambda_0(V_d))$), ($X_{n+1}(\lambda_1(V_d))$), ($X_{n+2}(\lambda_2(V_d))$) from the measured profiles $S_{R,MEAS}(V_d)$, $S_{G,MEAS}(V_d)$, $S_{B,MEAS}(V_d)$. The calculated spectral intensity values ($X_n(\lambda_0(V_d))$), ($X_{n+1}(\lambda_1(V_d))$), ($X_{n+2}(\lambda_2(V_d))$) may be expressed as a function of the control signal $V_d$ or as a function of the wavelength ($\lambda_0$, $\lambda_1$, or $\lambda_2$) of a transmittance peak of the Fabry-Perot Interferometer.

In particular, the spectral intensity distribution ($X(\lambda)$) of the input light LB1 may be calculated from the set of measured profiles $S_{R,MEAS}(V_d)$, $S_{G,MEAS}(V_d)$, $S_{B,MEAS}(V_d)$ by using the matrix elements ($K_{Rn}$, . . . . $K_{Bn+2}$) of the pseudo-inverse matrix $M^\dagger$.

One or more calculated spectra ($X_n(\lambda_0(V_d))$), ($X_{n+1}(\lambda_1(V_d))$), ($X_{n+2}(\lambda_2(V_d))$) may be outputted and/or stored in a memory (step #1130).

A computer program (PROG2) which when executed by at least one data processor (CNT2) may cause an apparatus (1000, 1002) to carry out one or more steps of the method.

A computer program product embodied on a non-transitory computer readable medium (MEM22) may comprise computer program code (PROG2) for performing one or more of steps of the method.

The calibrated spectral imaging device 500 may be used e.g. for remote sensing applications where it may have high transmittance at the wavelength bands selected for imaging. The device 500 may be used e.g. for monitoring spatial variations of color of an object OBJ1. The spectrometer 500 may be used e.g. for absorption measurement, where the wavelength Xo of a first transmittance peak is matched with an absorption band and the wavelength $\lambda_1$ of second transmittance peak is matched with a reference band. The device 500 may be used e.g. for absorption measurement, where the wavelength Xo of a first transmittance peak is matched with fluorescent light and the wavelength $\lambda_1$ of second transmittance peak is matched with the illuminating light, which induces the fluorescence.

Figure 9A:
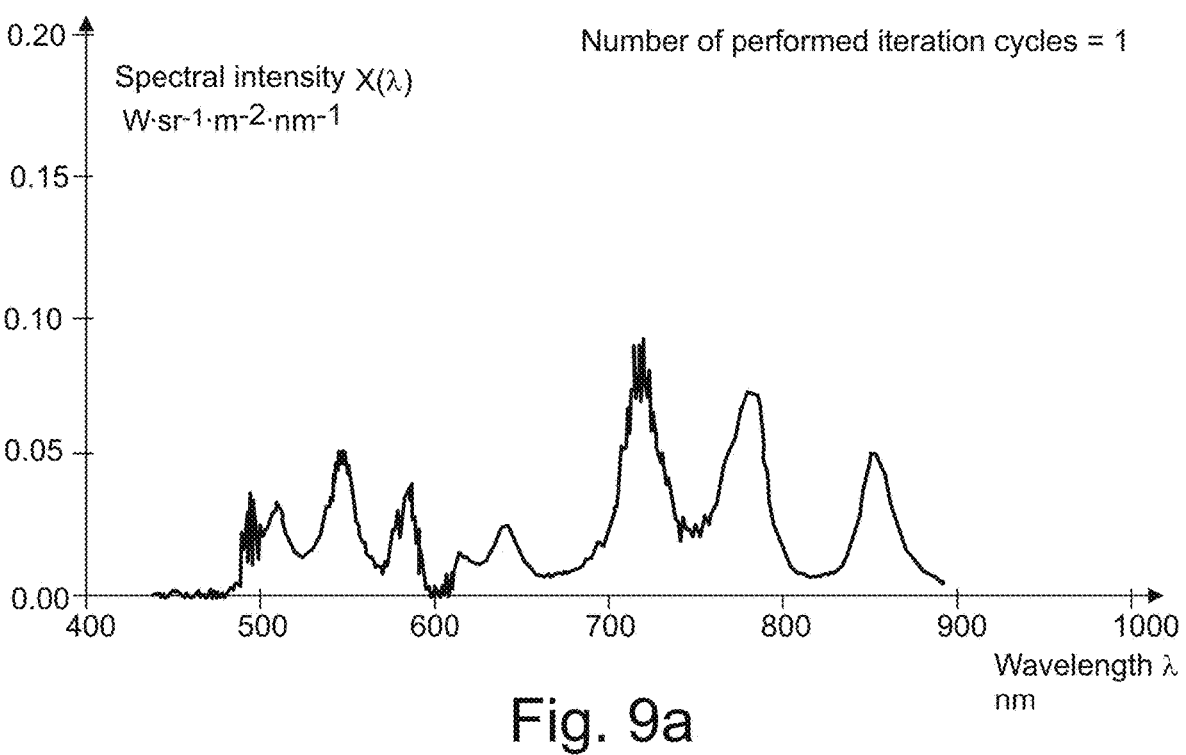
FIG. 9a shows, by way of example, a measured spectrum of the first calibration light, wherein the measured spectrum is calculated by using calibration data, which is available after a first iteration cycle.
Figure 9B:
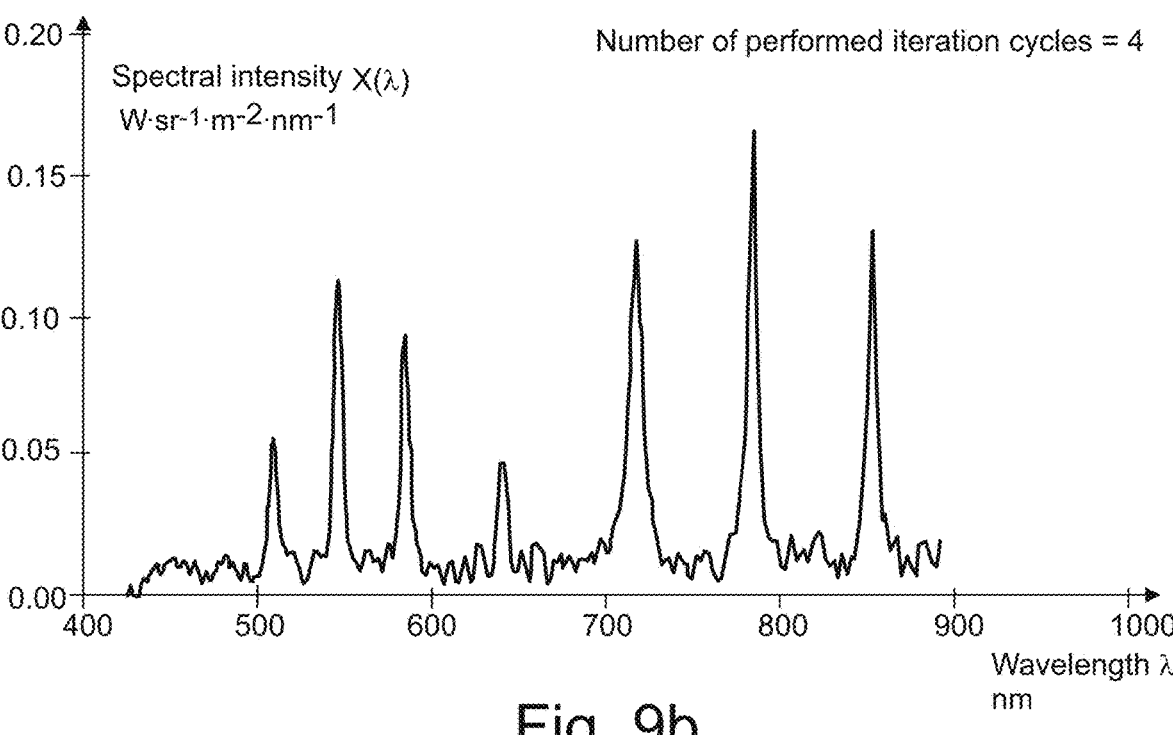
FIG. 9b shows, by way of example, a measured spectrum of the first calibration light, wherein the measured spectrum is calculated by using calibration data, which is available after a fourth iteration cycle.
Figure 9C:
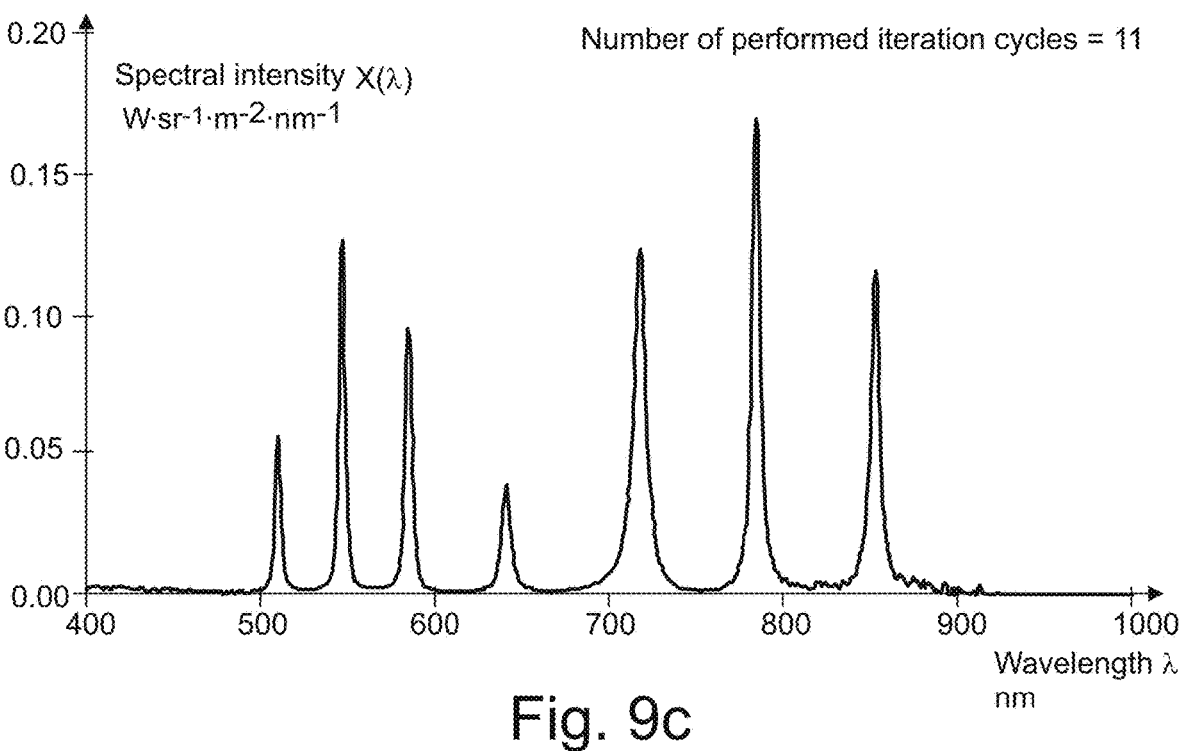
FIG. 9c shows, by way of example, a measured spectrum of the first calibration light, wherein the measured spectrum is calculated by using calibration data, which is available after an eleventh iteration cycle.

FIGS. 9a to 9c show, by way of example, the measured spectra $X(\lambda)$ of input light LB1, in a situation where the calibration light LB1CAL1 is used as the input light LB1, which is coupled to the spectral imaging device 500.

The spectra $X(\lambda)$ of FIG. 9a to 9c are calculated from the measured detector signals ($S_{R,MEAS}(V_d)$, $S_{R,MEAS}(V_d)$, $S_{B,MEAS}(V_d)$, $S_{IR,MEAS}(V_d)$) by using calibration data ($f_k$, $g_k$, $h_k$).

The calibration data ($f_k$, $g_k$, $h_k$) was iteratively modified until each simulated profile ($S_{R,SIM,k}$, $S_{G,SIM,k}$, $S_{B,SIM,k}$, $S_{IR,SIM,k}$) matched with the corresponding measured profile ($S_{R,MEAS}(V_d)$, $S_{R,MEAS}(V_d)$, $S_{B,MEAS}(V_d)$, $S_{IR,MEAS}(V_d)$) according to one or more matching criteria. Each completed iteration cycle took into account the four measured profiles ($S_{R,MEAS}(V_d)$, $S_{R,MEAS}(V_d)$, $S_{B,MEAS}(V_d)$, $S_{IR,MEAS}(V_d)$). Examples of the profiles are shown e.g. in FIGS. 5a and 5b.

The calibration data ($f_k$, $g_k$, $h_k$) used for calculating the spectrum $X(\lambda)$ shown in FIG. 9a was obtained by performing one iteration cycle (k=1).

The calibration data ($f_k$, $g_k$, $h_k$) used for calculating the spectrum $X(\lambda)$ shown in FIG. 9b was obtained by performing four iteration cycles (k=4).

The calibration data ($f_k$, $g_k$, $h_k$) used for calculating the spectrum $X(\lambda)$ shown in FIG. 9c was obtained by performing eleven iteration cycles (k=11).

Figure 9D:
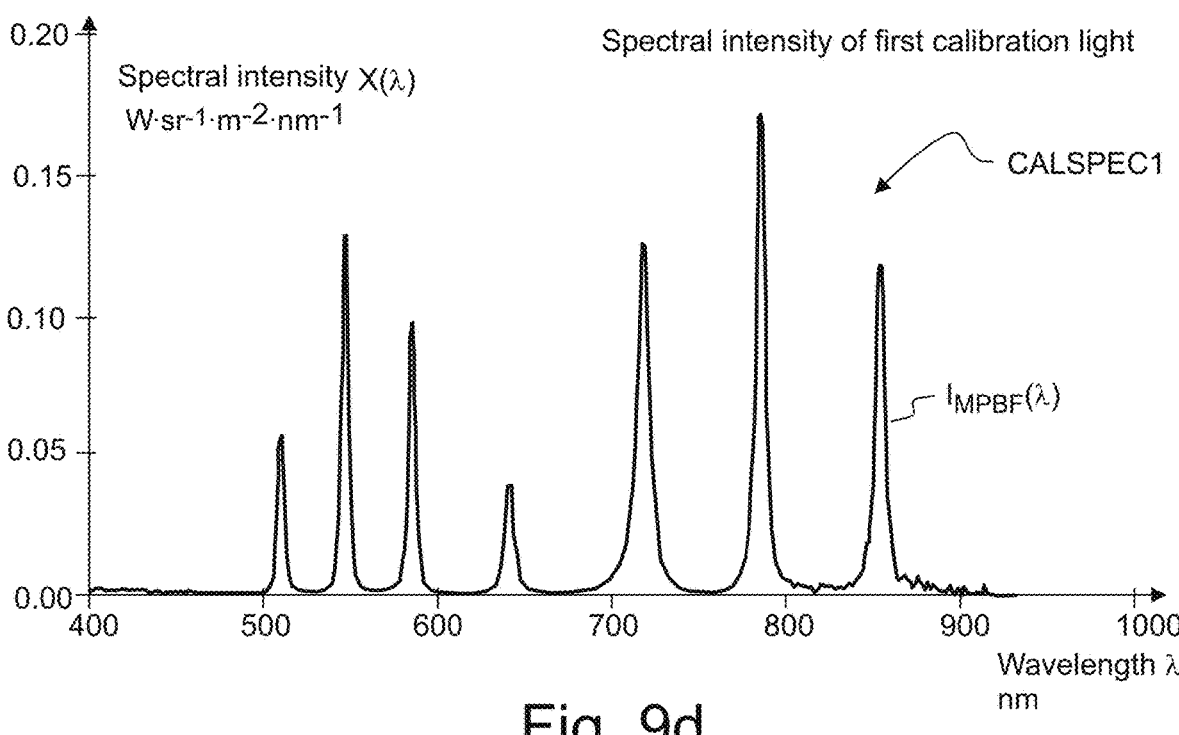
FIG. 9d shows, by way of example, the true spectrum of the first calibration light.

FIG. 9d shows the actual spectrum $I_{MPBF}(\lambda)$ of the first calibration light LB1CAL1, as measured by an accurate reference instrument, which is traceable to the international standards. The reference instrument may comprise e.g. a scanning monochromator and a detector.

Comparison of the measured spectrum of FIG. 9c with the actual spectrum FIG. 9d indicates that performing eleven iteration cycles (k=11) was sufficient in this example to provide calibration data ($f_k$, $g_k$, $h_k$), which calibration data enabled that the RMS deviation of the measured spectrum $X(\lambda)$ of FIG. 9c from the actual spectrum $I_{MPBF}(\lambda)$ of FIG. 9d was smaller than 0.5%. RMS means root mean square.

Increasing the number of the iteration cycles may further improve the accuracy of the measured spectrum. The number (k) of iteration cycles may be e.g. greater than 10. The number k may be e.g. greater than 100, or even greater than 1000. The number k may be e.g. in the range of 10 to 100. The number k may be e.g. in the range of 10 to 1000.

The unit of the horizontal scale of the spectrum $X(\lambda)$ may be e.g. nm. The unit of the vertical scale of the spectrum $X(\lambda)$ may be e.g. $W \cdot sr^{-1} \cdot m^{-2} \cdot nm^{-1}$. W denotes Watt. sr denotes steradian. m denotes meter. nm denotes nanometer. A spectral intensity value of the spectrum $X(\lambda)$ may represent e.g. the radiance of a surface of an object OBJ1 per unit wavelength.

Figure 10:
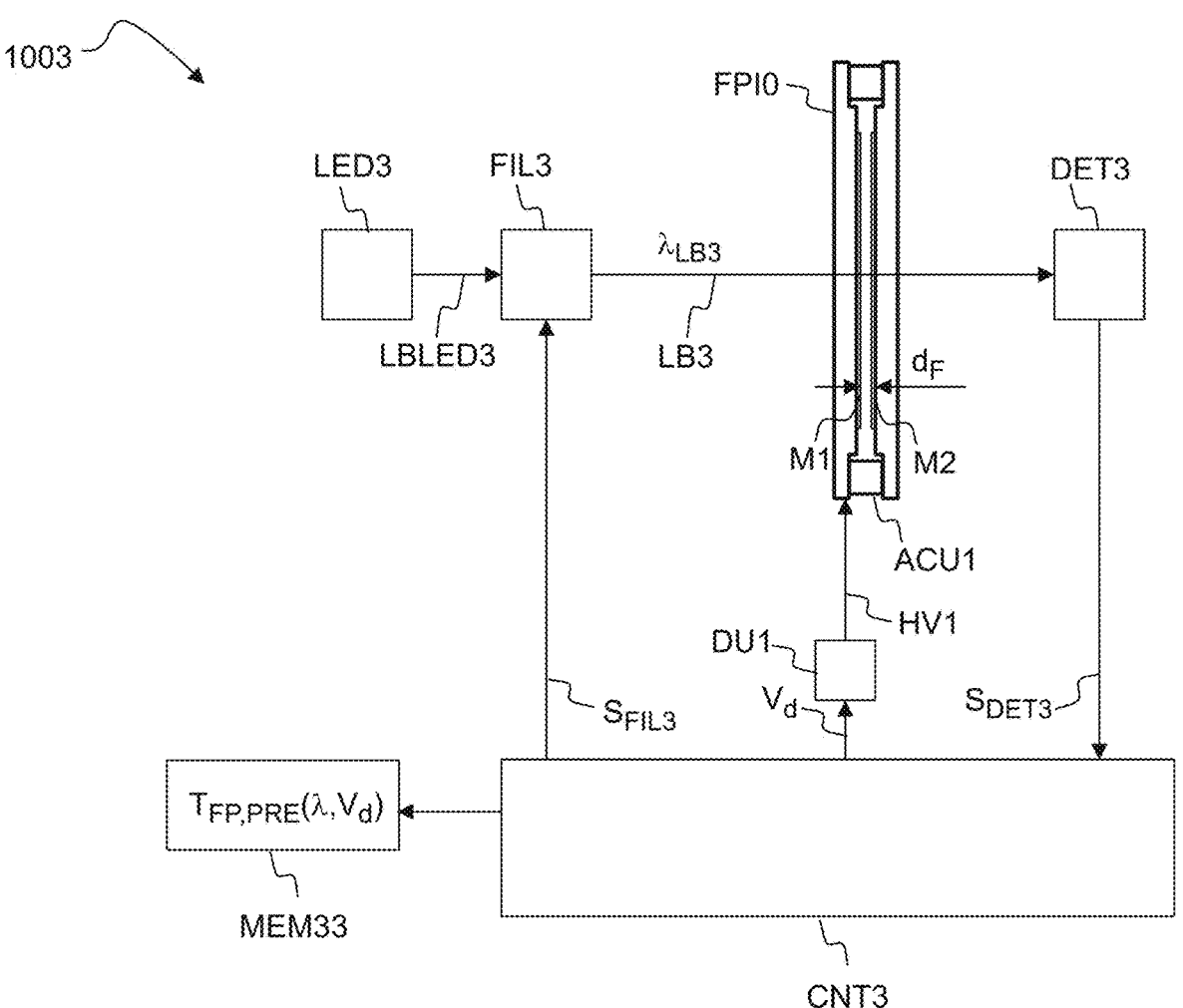
FIG. 10 shows, by way of example, measuring an initial spectral transmittance of a Fabry-Perot interferometer.

Referring to FIG. 10, the initial spectral transmittance function $T_{FP,PRE}(\lambda, V_d)$ may be measured e.g. by using an apparatus 1003, which comprises a light source LED3, a tunable filter FIL3, a representative Fabry-Perot interferometer FPI0, a detector DET3, and a control unit CNT3. The tunable filter FIL3 may provide monochromatic light LB3 by filtering broadband light LBLED3 obtained from the light source LED3 or by filtering broadband light transmitted through the representative Fabry-Perot interferometer FPI0. The tunable filter FIL3 may be e.g. a scanning monochromator. The filter FIL3 may also be positioned between the representative Fabry-Perot interferometer FPI0 and the detector DET3.

The method may comprise measuring the initial spectral transmittance function $T_{FP,PRE}(\lambda, V_d)$ by scanning the wavelength $\lambda_{LB3}$ of monochromatic light LB3 transmitted through the representative Fabry-Perot interferometer FPI0, by scanning the control parameter $V_d$ of the representative Fabry-Perot interferometer FPI0, and by recording the intensity of the monochromatic light LB3 as a function of the wavelength $\lambda_{LB3}$ and also as the function of the control parameter $V_d$. The recorded data may cover both scanning ranges RNG2 and RNG3.

The transmittance may be determined by dividing the recorded intensity function by a reference intensity function, which is recorded without the interferometer FPI0.

The tunable filter FIL3 may form monochromatic light LB3 at a tunable wavelength $\lambda_{LB3}$ by filtering broadband light LBLED3 obtained from the light source LED3. The detector DET3 may detect light LB3, which has been transmitted through the tunable filter FIL3 and through a Fabry-Perot interferometer FPI0. The detector DET3 may provide a signal $SD_{ET3}$ indicative of the intensity of the detected light (LB3). The control unit CNT3 and the detector DET3 may record the spectral intensity of the light LB3 transmitted through the tunable filter FIL3 and through a Fabry-Perot interferometer FPI1. The control unit CNT3 may vary the tunable wavelength $\lambda_{LB3}$ and the control parameter $V_d$, so as to record the spectral transmittance $T_{FP,PRE}(\lambda,V_d)$ as a function of the two parameters ($\lambda_{LB3}$, $V_d$). The recorded spectral transmittance $T_{FP,PRE}(\lambda,V_d)$ may be stored in a memory MEM33. The recorded spectral transmittance $T_{FP,PRE}(\lambda,V_d)$ may subsequently be communicated e.g. to a calibration apparatus 1000, 1002 and/or to a spectral imaging device 500.

The Fabry-Perot interferometer FPI1 of the spectral imaging device (500) may be combined with the image sensor SEN1 after the initial spectral transmittance function $T_{FP,PRE}(\lambda,V_d)$ has been measured.

The initial spectral transmittance function $T_{FP,PRE}(\lambda,V_d)$ may substantially represent the Fabry-Perot interferometer FPI1 of the assembled spectral imaging device 500.

The representative Fabry-Perot interferometer FPI0 may be the same interferometer or a different interferometer than the Fabry-Perot interferometer FPI1 of the spectral imaging device 500. The measured initial spectral transmittance function $T_{FP,PRE}(\lambda,V_d)$ of the representative Fabry-Perot interferometer FPI0 may be used to represent the initial spectral transmittance function $T_{FP,PRE}(\lambda,V_d)$ of the Fabry-Perot interferometer FPI1 of the spectral imaging device 500.

The assembled spectral imaging device 500 may comprise a first Fabry-Perot interferometer FPI1 and a first image sensor SEN1. The previously measured quantum efficiencies may be obtained by measuring properties of a second different image sensor. The previously measured spectral transmittance may be obtained by measuring properties of a second different Fabry-Perot interferometer FPI0. The previously measured quantum efficiencies and the spectral transmittance may be assumed to represent the assembled spectral imaging device 500 to some degree, but not exactly.

For the person skilled in the art, it will be clear that modifications and variations of the systems, products, apparatuses, devices and methods according to the present invention are perceivable. The figures are schematic. The particular embodiments described above with reference to the accompanying drawings are illustrative only and not meant to limit the scope of the invention, which is defined by the appended claims.

The invention claimed is:

1. A method for calibrating a spectral imaging device, the method comprising:

obtaining first spectral data, which specifies spectral quantum efficiency of detector pixels for an image sensor, obtaining second spectral data, which specifies a spectral transmittance function for a Fabry-Perot interferometer, providing the spectral imaging device, which comprises the Fabry-Perot interferometer and the image sensor, the image sensor comprising first detector pixels and second detector pixels, a spectral quantum efficiency of the first detector pixels being different from a spectral quantum efficiency of the second detector pixels, providing first calibration light, wherein the first calibration light has a first calibration spectrum which comprises a plurality of spectral peaks, coupling the first calibration light to the spectral imaging device, obtaining a first measured profile of the first calibration light by recording first detector pixel signals during scanning a control parameter of the Fabry-Perot interferometer, obtaining a second measured profile of the first calibration light by recording second detector pixel signals during scanning the control parameter, determining a first simulated profile from the first calibration spectrum by using the spectral quantum efficiency of the first detector pixels, by using the spectral transmittance function, and by using first calibration data, determining a second simulated profile from the first calibration spectrum by using the spectral quantum efficiency of the second detector pixels, by using the spectral transmittance function, and by using the first calibration data, modifying the first calibration data until the simulated profiles match with the corresponding measured profiles, according to one or more matching criteria, and storing the modified first calibration data in a memory.

2. The method of claim 1, wherein the spectral transmittance function specifies the spectral transmittance of the Fabry-Perot interferometer as a function of wavelength, and also as a function of the control parameter, wherein the control parameter is indicative of the distance between mirrors of the Fabry-Perot interferometer.

3. The method of claim 1, wherein the number of color channels of the spectral imaging device is in the range of 2 to 5.

4. The method according to claim 1, wherein the number of spectral transmittance peaks of the spectral transmittance function is in the range of 2 to 5 within the spectral measurement range of the spectral imaging device, wherein the number of the spectral transmittance peaks within the spectral measurement range is smaller than or equal to the number of the color channels.

5. The method according to claim 1, wherein the number of passbands of a multi pass band filter is in the range of 3 to 20 within the spectral measurement range of the spectral imaging device.

6. The method according to claim 1, comprising:

providing second calibration light, which has a second broadband calibration spectrum, coupling the second calibration light to the spectral imaging device, obtaining a first additional measured profile of the second calibration light by recording first additional detector pixel signals during scanning a control parameter of the Fabry-Perot interferometer, obtaining a second additional measured profile of the second calibration light by recording second additional detector pixel signals during scanning the control parameter, determining a first additional simulated profile from the second calibration spectrum by using the spectral quantum efficiency of the first detector pixels, by using the spectral transmittance function of the Fabry-Perot interferometer, and by using the first calibration data, determining a second additional simulated profile from the second calibration spectrum by using the spectral quantum efficiency of the second detector pixels, by using the spectral transmittance function of the Fabry-Perot interferometer, and by using the first calibration data, modifying the first calibration data until the additional simulated profiles match with the corresponding additional measured profiles according to one or more matching criteria.

7. The method according to claim 1, comprising:

forming matrix elements of a first matrix from the quantum efficiencies of the detector pixels and from the spectral transmittance function by using the modified first calibration data, wherein the matrix elements of the first matrix are coefficients for determining detector signals of the different color channels as linear combinations of spectral intensity values of input light at spectral positions of spectral transmittance peaks of the Fabry-Perot interferometer, forming a second matrix such that the second matrix is an inverse matrix or a pseudo-inverse matrix of the first matrix, and outputting and/or storing matrix elements of the second matrix in a memory.

8. The method of claim 7, comprising:

forming an image of an object on the image sensor by coupling input light received from the object to the spectral imaging device, obtaining detector signals from the image sensor, calculating one or more calibrated spectral intensity values of the input light from the obtained detector signals by using the matrix elements of the second matrix.

9. The method according to claim 1, wherein the distance between mirrors of the Fabry-Perot interferometer is adjustable, wherein the image sensor comprises a plurality of the first detector pixels and a plurality of the second detector pixels, the detector pixels are arranged to detect light transmitted through the Fabry-Perot interferometer, the first detector pixels have a first spectral quantum efficiency, the second detector pixels have a second different spectral quantum efficiency, the Fabry-Perot interferometer has a first transmittance peak and a second transmittance peak, the first detector pixels are arranged to detect light at the spectral position of the first transmittance peak and at the spectral position of the second transmittance peak.

10. The method according to claim 1, comprising measuring an initial spectral transmittance function by scanning the wavelength of monochromatic light transmitted through a representative Fabry-Perot interferometer, wherein measuring the initial spectral transmittance function comprises scanning the control parameter of the representative Fabry-Perot interferometer, and recording the intensity of the monochromatic light as a function of the wavelength and as a function of the control parameter, wherein the Fabry-Perot interferometer of the spectral imaging device is combined with the image sensor after the initial spectral transmittance function has been measured.

11. An apparatus for calibrating a spectral imaging device, which comprises a combination of a Fabry-Perot interferometer and an image sensor, the image sensor comprising first detector pixels and second detector pixels, a spectral quantum efficiency of the first detector pixels being different from a spectral quantum efficiency of the second detector pixels, the apparatus comprising:

a communication unit for obtaining first spectral data, which specifies spectral quantum efficiency of detector pixels for an image sensor, a communication unit for obtaining second spectral data, which specifies a spectral transmittance function for a Fabry-Perot interferometer, a first calibration light source to form first calibration light, which has a first calibration spectrum which comprises a plurality of spectral peaks, wherein the apparatus is arranged to:

obtain a first measured profile of the first calibration light by recording first detector pixel signals during scanning a control parameter of the Fabry-Perot interferometer, obtain a second measured profile of the first calibration light by recording second detector pixel signals during scanning the control parameter, determine a first simulated profile from the first calibration spectrum by using the spectral quantum efficiency of the first detector pixels, by using the spectral transmittance function, and by using first calibration data, determine a second simulated profile from the first calibration spectrum by using the spectral quantum efficiency of the second detector pixels, by using the spectral transmittance function, and by using the first calibration data, modify the first calibration data until the simulated profiles match with the corresponding measured profiles according to one or more matching criteria, and store the modified first calibration data in a memory.

* * * * *